US011996980B2

(12) United States Patent
Patel et al.

(10) Patent No.: US 11,996,980 B2
(45) Date of Patent: May 28, 2024

(54) SYSTEMS AND METHODS FOR NETWORK CONFIGURATION MANAGEMENT

(71) Applicant: Cox Communications, Inc., Atlanta, GA (US)

(72) Inventors: Jignesh Patel, Atlanta, GA (US); Ted Boone, Atlanta, GA (US); Richard Brown, Atlanta, GA (US); Kyle Cooper, Atlanta, GA (US); Derek Bantug, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/410,374

(22) Filed: Aug. 24, 2021

(65) Prior Publication Data

US 2021/0392037 A1 Dec. 16, 2021

Related U.S. Application Data

(63) Continuation of application No. 16/663,157, filed on Oct. 24, 2019, now Pat. No. 11,133,987.

(Continued)

(51) Int. Cl.
*H04L 41/082* (2022.01)
*H04L 41/0893* (2022.01)
(Continued)

(52) U.S. Cl.
CPC ............ *H04L 41/082* (2013.01); *H04L 41/12* (2013.01); *H04L 41/16* (2013.01);
(Continued)

(58) Field of Classification Search
CPC ..... G06F 16/285; H04L 45/125; H04L 45/02; H04L 43/0882; H04L 43/0876;
(Continued)

(56) References Cited

U.S. PATENT DOCUMENTS 6,141,684 A * 10/2000 McDonald .......... G07F 17/0014
705/52
7,298,716 B2 * 11/2007 Abraham .......... H04W 52/0232
370/321

(Continued)

*Primary Examiner* — Schquita D Goodwin
*Assistant Examiner* — Linh T. Nguyen
(74) *Attorney, Agent, or Firm* — Eversheds Sutherland (US) LLP

(57) ABSTRACT

Disclosed are systems and methods for network configuration management systems and methods. In some embodiments, the discloses systems and methods may involve receiving data from one or more nodes within a particular network. The data may include, for example, topology, telemetry, geographical, and other data relating to the nodes, the network, and/or the functionality of the nodes or network. Once received, such data may be cleaned and processing may be performed on the data. Such processing may involve clustering the data into groups based on various parameters and performing forecasting on the data to determine future usage rates and capacity information, for example. The clustering and forecasting results may be fed to a rules engine and/or an optimization engine, which may then determine appropriate actions to take on the network (e.g., changes to various nodes in terms of technology and/or number of nodes).

20 Claims, 20 Drawing Sheets

Related U.S. Application Data

(60) Provisional application No. 62/749,925, filed on Oct. 24, 2018.

(51) Int. Cl.
*H04L 41/0896* (2022.01)
*H04L 41/12* (2022.01)
*H04L 41/147* (2022.01)
*H04L 41/16* (2022.01)
*H04L 41/50* (2022.01)

(52) U.S. Cl.
CPC ...... *H04L 41/5096* (2013.01); *H04L 41/0893* (2013.01); *H04L 41/0896* (2013.01); *H04L 41/147* (2013.01)

(58) Field of Classification Search
CPC ............. H04L 43/0888; H04L 43/0864; H04L 43/0817; H04L 47/125; H04L 41/082; H04L 41/0893; H04L 41/0896; H04L 41/147; H04L 47/823; H04L 41/16; H04L 9/0866
See application file for complete search history.

(56) References Cited

U.S. PATENT DOCUMENTS

| | | | | |
|---|---|---|---|---|
| 8,856,797 | B1* | 10/2014 | Siddiqui | G06F 9/5077 718/104 |
| 9,990,607 | B1* | 6/2018 | Hua | H04L 1/00 |
| 10,491,940 | B1* | 11/2019 | Sinnott | H04N 21/4858 |
| 2006/0184939 | A1* | 8/2006 | Sahoo | G06F 9/505 718/100 |
| 2010/0265825 | A1* | 10/2010 | Blair | H04L 41/0894 370/236 |
| 2011/0302578 | A1* | 12/2011 | Isci | 455/41.2 |
| 2012/0322383 | A1* | 12/2012 | Kennedy | H04L 67/10 709/221 |
| 2015/0043410 | A1* | 2/2015 | Chaturvedi | H04W 52/0229 370/311 |
| 2015/0326441 | A1* | 11/2015 | Smith | H04L 45/122 370/255 |
| 2015/0373692 | A1* | 12/2015 | Jern | H04W 4/023 370/329 |
| 2016/0360363 | A1* | 12/2016 | Mochizuki | G01S 5/0289 |
| 2018/0139148 | A1* | 5/2018 | Gamage | H04L 41/122 |
| 2018/0234302 | A1* | 8/2018 | James | G06N 20/00 |
| 2019/0129918 | A1* | 5/2019 | Moon | H04L 41/044 709/202 |
| 2019/0370049 | A1* | 12/2019 | Gopalan | G06F 9/45558 |
| 2020/0092732 | A1* | 3/2020 | Raj | G06F 9/5083 718/1 |
| 2020/0136898 | A1* | 4/2020 | Patel | H04L 41/082 |
| 2021/0334011 | A1* | 10/2021 | Shu | G06F 9/5061 |

* cited by examiner

| Sub_Region_Desc | Site_Desc | Headend | Facility_Desc | Node_Name | Host_Name | Device_Type | Service_Type | Channel_Interface | Channel_Type | Ofdm_Enablement | Slot_Number | Card_Number |
|---|---|---|---|---|---|---|---|---|---|---|---|---|
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | CMTS | DOCSIS | Cable7/1/3-Upstream | Cable | N | 7 | 1 |
| State | Country | 61 | Aliso Viejo | 2071A | Name | RFGW | DOCSIS | Modular-Cable3/0/1 | Modular-Cable | N | 3 | 0 |
| State | Country | 61 | Aliso Viejo | 2071A | Name | RFGW | DOCSIS | Modular-Cable3/0/1 | Modular-Cable | N | 3 | 0 |
| State | Country | 61 | Aliso Viejo | 2071A | Name | RFGW | DOCSIS | Modular-Cable3/0/1 | Modular-Cable | N | 3 | 0 |
| State | Country | 61 | Aliso Viejo | 2071A | Name | RFGW | DOCSIS | Modular-Cable3/0/1 | Modular-Cable | N | 3 | 0 |
| State | Country | 61 | Aliso Viejo | 2071A | Name | RFGW | DOCSIS | Modular-Cable3/0/1 | Modular-Cable | N | 3 | 0 |

FIG. 4

| Resource Id | Ureport Start Date | Report End Date | Interface Name | Cmts Name | Interface Details | Speed | Utilization_Max_Percent | Utilization_Avg_Percent |
|---|---|---|---|---|---|---|---|---|
| 123456789 | 13/6/19 | 14/8/19 | Cable6/1/4-Upstream4 | abcdefgh01 | xxxxxxxxxxxxxxxxxxxxxxxxxxxxxx | 2.56 Mbps | 3.415956 | 0.178076364 |
| 135456789 | 13/6/19 | 14/8/19 | Cable8/1/1-Upstream3 | abcdefgh02 | xxxxxxxxxxxxxxxxxxxxxxxxxxxxxx | 15.36 Mbps | 24.481674 | 11.4297466 |
| 145456789 | 13/6/19 | 14/8/19 | Cable6/1/5-Upstream4 | aefgehcb03 | xxxxxxxxxxxxxxxxxxxxxxxxxxxxxx | 2.56 Mbps | 3.051342 | 0.265030548 |
| 135456879 | 13/6/19 | 14/8/19 | Cable7/0/5-Upstream4 | abcdefgh04 | xxxxxxxxxxxxxxxxxxxxxxxxxxxxxx | 2.56 Mbps | 28.440627 | 0.872354597 |
| 123456789 | 13/6/19 | 14/8/19 | Cable6/1/3-Upstream3 | acbdefgh03 | xxxxxxxxxxxxxxxxxxxxxxxxxxxxxx | 15.36 Mbps | 61.307449 | 26.67111366 |
| 135456789 | 13/6/19 | 14/8/19 | Cable8/1/2-Upstream2 | aefgehcb02 | xxxxxxxxxxxxxxxxxxxxxxxxxxxxxx | 30.72 Mbps | 21.850925 | 3.58305714 |
| 154465879 | 13/6/19 | 14/8/19 | Cable6/0/1-Upstream1 | abcdefgh01 | xxxxxxxxxxxxxxxxxxxxxxxxxxxxxx | 30.72 Mbps | 37.616824 | 14.13567886 |
| 135465789 | 13/6/19 | 14/8/19 | Cable6/1/4-Upstream0 | acbdefgh02 | xxxxxxxxxxxxxxxxxxxxxxxxxxxxxx | 30.72 Mbps | 53.789589 | 14.63353545 |
| 123456789 | 13/6/19 | 14/8/19 | Cable7/1/0-Upstream4 | aefgehcb05 | xxxxxxxxxxxxxxxxxxxxxxxxxxxxxx | 2.56 Mbps | 5.997106 | 0.791301123 |
| 135465879 | 13/6/19 | 14/8/19 | Cable8/1/5-Upstream3 | abcdefgh01 | xxxxxxxxxxxxxxxxxxxxxxxxxxxxxx | 15.36 Mbps | 0 | 0 |
| 135465879 | 13/6/19 | 14/8/19 | Cable7/0/0-Upstream3 | acbdefgh02 | xxxxxxxxxxxxxxxxxxxxxxxxxxxxxx | 15.36 Mbps | 38.281879 | 10.86367225 |
| 154465879 | 13/6/19 | 14/8/19 | Cable6/1/0-Upstream3 | aefgehcb04 | xxxxxxxxxxxxxxxxxxxxxxxxxxxxxx | 15.36 Mbps | 49.457361 | 17.03008589 |
| 123456789 | 13/6/19 | 14/8/19 | Cable8/1/1-Upstream1 | abcdefgh05 | xxxxxxxxxxxxxxxxxxxxxxxxxxxxxx | 30.72 Mbps | 98.813598 | 10.97004486 |
| 135456789 | 13/6/19 | 14/8/19 | Cable7/0/1-Upstream2 | acbdefgh06 | xxxxxxxxxxxxxxxxxxxxxxxxxxxxxx | 30.72 Mbps | 43.115404 | 11.27931858 |
| 123456789 | 13/6/19 | 14/8/19 | Cable8/0/3-Upstream3 | aefgehcb07 | xxxxxxxxxxxxxxxxxxxxxxxxxxxxxx | 15.36 Mbps | 0 | 0 |

FIG. 5A

| Resource Id | Ureport Start Date | Report End Date | Interface Name | cmts Name | Rf Channel Utilization Max_Percent | Rf Channel Utilization Avg_Percent | Rf Channel Utilization 95th_Percentile | Dt | System Name |
|---|---|---|---|---|---|---|---|---|---|
| 123456789 | 1/29/18 | 2/4/18 | Modular-Cable6/1/1:13 | abcdefgh01 | 30.61 | 8.437276786 | 20.13179 | 2/7/18 | Georgia |
| 135456789 | 1/29/18 | 2/4/18 | Modular-Cable3/2/3:6 | abcdefgh02 | 48.1 | 17.16386409 | 35.602341 | 2/7/18 | Georgia |
| 145456789 | 1/29/18 | 2/4/18 | Modular-Cable3/1/2:2 | aefgehcb03 | 41.98 | 11.97222222 | 21.745473 | 2/7/18 | Georgia |
| 135465879 | 1/29/18 | 2/4/18 | Modular-Cable3/2/2:1 | abcdefgh04 | 20.11 | 5.249087302 | 11.126548 | 2/7/18 | Georgia |
| 123456789 | 1/29/18 | 2/4/18 | Modular-Cable3/2/1:7 | abcdefgh03 | 16.62 | 3.643497024 | 8.618452 | 2/7/18 | Georgia |
| 135456789 | 1/29/18 | 2/4/18 | Modular-Cable1/2/0:10 | aefgehcb02 | 78.71 | 23.25986111 | 39.1158 | 2/7/18 | Georgia |
| 154465879 | 1/29/18 | 2/4/18 | Modular-Cable3/0/3:14 | abcdefgh01 | 25.36 | 7.562876984 | 18.205888 | 2/7/18 | Georgia |
| 135465879 | 1/29/18 | 2/4/18 | Modular-Cable1/0/3:13 | aebcdefgh02 | 8.75 | 10.02311508 | 3.515308 | 2/7/18 | Georgia |
| 123456789 | 1/29/18 | 2/4/18 | Modular-Cable1/2/1:9 | aefgehcb05 | 47.22 | 12.01861607 | 22.770506 | 2/7/18 | Georgia |
| 135456789 | 1/29/18 | 2/4/18 | Modular-Cable1/0/3:0 | abcdefgh01 | 45.48 | 17.24287202 | 26.906237 | 2/7/18 | Georgia |
| 135465879 | 1/29/18 | 2/4/18 | Modular-Cable1/2/1:9 | abcdefgh02 | 40.23 | 16.56666667 | 26.479335 | 2/7/18 | Georgia |
| 154465879 | 1/29/18 | 2/4/18 | Modular-Cable6/1/0:11 | aefgehcb04 | 18.37 | 1.072202381 | 3.701627 | 2/7/18 | Georgia |
| 123456789 | 1/29/18 | 2/4/18 | Modular-Cable1/2/5:2 | abcdefgh05 | 45.48 | 17.54635417 | 28.989324 | 2/7/18 | Georgia |
| 135456789 | 1/29/18 | 2/4/18 | Modular-Cable1/0/4:21 | abcdefgh06 | 27.11 | 4.833740079 | 13.180734 | 2/7/18 | Georgia |
| 123456789 | 1/29/18 | 2/4/18 | Modular-Cable3/0/3:12 | aefgehcb07 | 67.34 | 13.4484921 | 28.19698 | 2/7/18 | Georgia |

| Market | Name | Hub | City | Passings | Residential | Commercial | mdu | Vacant |
|---|---|---|---|---|---|---|---|---|
| Greater Country | E-36 | Georgia | Dallas | 1548 | 645 | 60 | 259 | 154 |
| Greater Country | F-28 | Georgia | Chicago | 541 | 844 | 6 | 0 | 15 |
| Greater Country | E-48 | Georgia | Houston | 356 | 13 | 5 | 66 | 21 |
| Greater Country | N-25 | Georgia | Pheonix | 321 | 154 | 13 | 52 | 2 |
| Greater Country | G-65 | Georgia | Baton Rouge | 7 | 3 | 2 | 0 | 4 |
| Greater Country | G-04 | South (Pecue) | Charlotte | 154 | 451 | 26 | 0 | 2 |
| Greater Country | B-06 | South (Pecue) | San Jose | 269 | 132 | 5 | 129 | 5 |

FIG. 6B

| Node_desc | Host_name | State_tech | Site_key_id | Dt | Us_Load | Ds_Load | p95_mbps_pctl_us | p95_mbps_pctl_ds | Capacity_mbps_us | Capacity_mbps_ds | Aerial_Mileage | Buried_Mileage | Ampli-fiers | Cas-cade | Specification | lat | lon | Splice_Name | Zip_Code | Res_hhp | ds_ofdm_Load |
|---|---|---|---|---|---|---|---|---|---|---|---|---|---|---|---|---|---|---|---|---|---|
| F-32 | BTNRC APC02 | D31 | | 5/6/18 | 41.678 12813 | 125.264 151511 | 0.1583 21523 | 0.2228 74979 | 107.52 | 2796.34 | 7.3072 | 6.9043 | 52 | 0 | (ON-61)OM 41GJNW | 30.519 95254 | 91.145 46537 | BRS-671 | 70811 | 655 | 0.0051 667 |
| F-32 | BTNRC APC02 | D31 | | 7/29/18 | 46.835 83329 | 125.895 457158 | 1.1547 15111 | 0.2679 92556 | 107.52 | 2796.34 | 7.3072 | 6.9043 | 52 | 0 | (ON-61)OM 41GJNW | 30.519 95254 | 91.145 46537 | BRS-671 | 70811 | 655 | 0.20566 4184 |
| F-32 | BTNRC APC02 | D31 | | 5/13/18 | 44.440 61568 | 124.698 254693 | 0.4836 13246 | 0.2375 20746 | 107.52 | 2796.34 | 7.3072 | 6.9043 | 52 | 0 | (ON-61)OM 41GJNW | 30.519 95254 | 91.145 46537 | BRS-671 | 70811 | 655 | 0 |
| F-32 | BTNRC APC02 | D31 | | 6/17/18 | 48.856 6527 | 784.897 365941 | 1.2568 51415 | 0.2751 90676 | 107.52 | 2796.34 | 7.3072 | 6.9043 | 52 | 0 | (ON-61)OM 41GJNW | 30.519 95254 | 91.145 46537 | BRS-671 | 70811 | 655 | 0.6315 84789 |

| xxxxxx xx | xxxx | xxxxxx xx | xxxx | xxxx | xxxx | Type | xxxx | xxxx | xxxx | xxxx | xxxx | xxxx xxx | xxxx | xxxx | xxxx | xxxx | xxxx | xxxx | xxxx |
|---|---|---|---|---|---|---|---|---|---|---|---|---|---|---|---|---|---|---|---|
| 14 | Alabama | Orange 333 County | "" | Aliso Viejo | ALS/CMT xxx | DOCSIS | 33 | 10368 | 6/1/18 | 7/20/18 | . | Y | "" | 2018-05 | 2018-06 | 2018-07 | 2018-08 | 14 | xxxx | xxxxx |
| 14 | Alabama | Orange 333 County | "" | Aliso Viejo | ALS/CMT xxx | DOCSIS | 33 | 11144 | 6/1/18 | 7/20/18 | " | Y | "" | 2018-05 | 2018-06 | 2018-07 | 2018-08 | 14 | xxxx | xxxxx |
| 14 | Alabama | Orange 333 County | "" | Aliso Viejo | ALS/CMT xxx | DOCSIS | 33 | 12235 | 6/1/18 | 7/20/18 | . | Y | "" | 2018-05 | 2018-06 | 2018-07 | 2018-08 | 14 | xxxx | xxxxx |
| 14 | Alabama | Orange 333 County | "" | Aliso Viejo | ALS/CMT xxx | DOCSIS | 33 | 12232 | 6/1/18 | 7/20/18 | . | Y | "" | 2018-05 | 2018-06 | 2018-07 | 2018-08 | 14 | xxxx | xxxxx |
| 14 | Alabama | Orange 333 County | "" | Aliso Viejo | ALS/CMT xxx | DOCSIS | 34 | 9346 | 6/1/18 | 7/20/18 | . | Y | "" | 2018-05 | 2018-06 | 2018-07 | 2018-08 | 14 | xxxx | xxxxx |
| 14 | Alabama | Orange 333 County | "" | Aliso Viejo | ALS/CMT xxx | DOCSIS | 35 | 9950 | 6/1/18 | 7/20/18 | . | Y | "" | 2018-05 | 2018-06 | 2018-07 | 2018-08 | 14 | xxxx | xxxxx |

FIG. 7

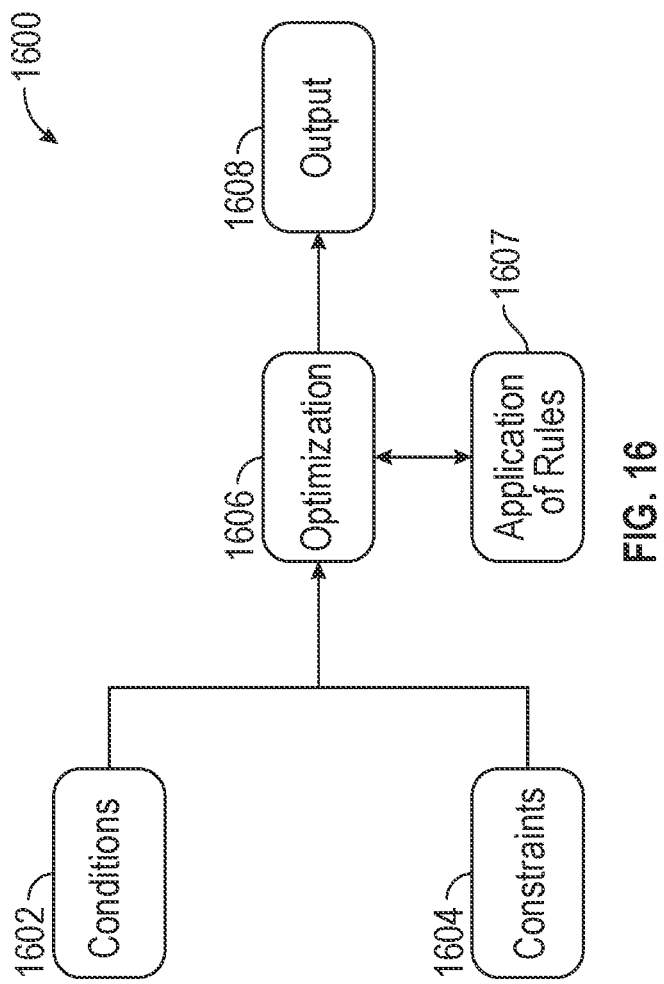

1700 1702

Conditions for Node: 4280

1703 • Monthly Profit of $ x
1704 • Cost of Upgrade by Technology is $ $c_u$
1705 • Maintenance Cost of Each Technology is $ $c_m$
1706 • And Few More not Listed for Brevity

1707

Subject to Constraints Over Time Refer: Rule Spreadsheet

1708 • Time to Upgrade (in Months) is $t_m$
1709 • Number of Nodes that can be Upgraded Each Year are n
1710 • Total Budget Available Annually is $ b
1711 • Technology Upgrade Policy

1706

Minimize Cost of Upgrade and Maximize Profitability of Node

- Min(Cost) and Max(Profit)
  - Sum of Cost Over 10 Years
  - Sum of Profit Over 10 Years
  - Minimize Budget Spend
- Provide Optimal Date to Upgrade Technology

1708

Represented as;

Minimize x    f(x)
Subject to    $g_i(x) \leq 0, i = 1,....,m$
              $h_i(x) = 0, i = 1,....,p$ Where f(x) is the Objective Function to be Minimized Over x
$g_i(x) \leq 0$ is the Inequality Constraint
$h_i(x) \leq 0$ is the Equality Constraint

FIG. 17

SYSTEMS AND METHODS FOR NETWORK CONFIGURATION MANAGEMENT

CROSS-REFERENCE TO RELATED PATENT APPLICATIONS

The present application is a continuation of and claims priority from U.S. patent application Ser. No. 16/663,157, filed Oct. 24, 2019, which claims priority from U.S. Provisional Patent Application No. 62/749,925, filed Oct. 24, 2018, the disclosures of which are incorporated by reference as set forth in full.

TECHNICAL FIELD

The disclosure generally relates to network planning, and, in particular, relates to systems and methods for network configuration management.

BACKGROUND

Strategic network planning may be a tedious and sometimes manual process. Transforming network infrastructure to support gigabit symmetrical speed offerings may be capital intensive. Such capital-intensive projects may need a strategic plan that provides prioritization using long-term forecasting and accounting for risk and macro-economic factors.

The key business challenges with the current process of producing a prioritized network plan may include at least scaling, repeatability, and traceability. However, when there may be tens of thousands of nodes in a network, then scaling to a few hundred thousand nodes to meet network and customer growth may be necessary. This increase in nodes may make it difficult to continue with the manual process of building a strategic network plan. For example, such manual processes may be time-consuming and take considerable amounts of overhead, among other difficulties.

BRIEF DESCRIPTION OF THE DRAWINGS

FIG. 4 illustrates an example of data provided by a node, according to an embodiment of the disclosure.

FIG. 5A-5B illustrate an example of data provided by a node, according to an embodiment of the disclosure.

FIGS. 6A-6B illustrate an example of data provided by a node, according to an embodiment of the disclosure.

FIG. 7 illustrates an example of configuration file data, according to an embodiment of the disclosure.

FIG. 16 illustrates an example of an optimization process flow, according to an embodiment of the disclosure.

FIG. 17 illustrates an example optimization use case, according to an embodiment of the disclosure.

DETAILED DESCRIPTION OF THE DISCLOSURE

Figure 1:
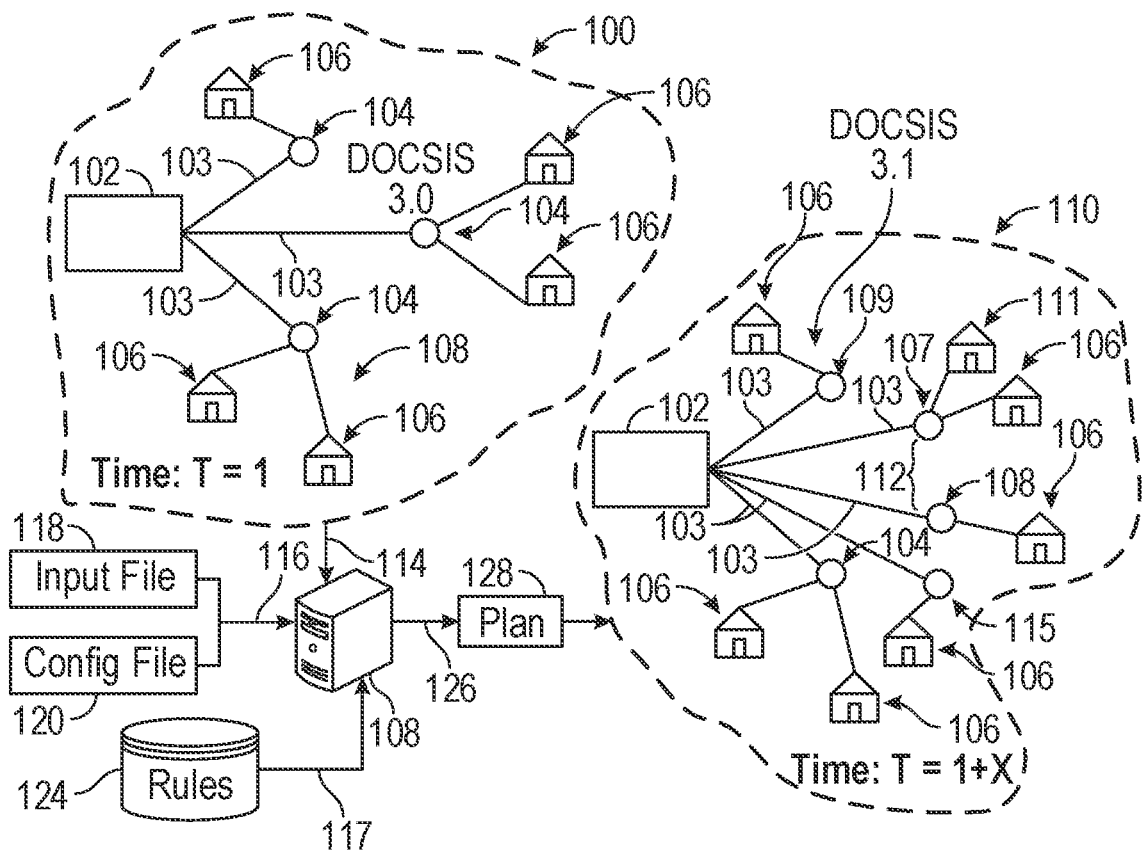
FIG. 1 illustrates an example change to a network architecture according to an embodiment of the disclosure.

Embodiments of the disclosure can provide systems and methods for network configuration management. Such systems and methods for network configuration management may involve determining changes to be made to a particular network based on data obtained from various elements included within the network (e.g., nodes in the network) (hereinafter, such elements may be referred to as "nodes," but may include any other element) as well as determined future forecasts of various metrics associated with the elements on the networks. Such changes may, for example, involve upgrading certain elements on the network to a newer (e.g., upgrade from DOCSIS 3.0 to DOCSIS 3.1) or different types of technology (change the element from using DOCSIS to PON). Such changes may, for example, also involve adding or removing elements from the network (e.g., performing a node split at a node that is deemed to be experiencing high usage rates, or merely adding a new node to the network at a particular location). These changes are merely examples, and are not intended to be limiting, as any change to the network may be facilitated.

The determination as to the changes to be made to the network may initially involve obtaining data pertaining to the elements on the network. For example, each element (e.g., node) in the network may be capable of providing data about itself or any other nodes. Additionally, or alternatively, the network itself may be able to provide aggregated data about multiple elements within the network, or data about the network as a whole. As non-limiting examples, the data may include topology data, telemetry data, geographical data, and/or any other types of data that may be relevant to the node, the network, and/or the functionality of both. For example, a node may provide an identifier, data pertaining to its location, and data pertaining to its bandwidth and usage at particular points in time. Relevant data may also be received from external sources, for example, data relating to business rules and/or constraints dictating how a network may be upgraded given certain conditions.

Any of the aforementioned data may be received in a raw or imperfect form, and thus, cleaning may be performed before analysis of the data may be performed. This cleaning process may involve multiple operations. One operation may involve using fuzzy logic that may be applied to clean the data. Fuzzy logic may serve to remedy inconsistencies in the data and translate the data into a form that is comprehensible by the system it is being received by. For example, the data received from a node may include an identifier "N00154," and the system that receives the data may not be able to recognize that this identifier represents node "154." Fuzzy logic may serve to remedy this deficiency and allow the system to interpret "N00154" as "154" and properly identify the node. Another operation may involve establishing a cadence on the data. The cadence may be a quality check that is intended to determine whether the data is being received from the network elements at a particular frequency and at particular times (this is described in greater detail with reference to FIG. 8 below). Another operation may involve applying algorithmic de-noising to the data. In some instances, algorithmic de-noising may address scenarios where one or more nodes are underreporting or overreporting any data. One example of such de-noising may include imputation applied to infer missing values for households served by a given node. The number of households served may be a key indicator for capacity planning, and underreporting or overreporting the number of households served by a given node may result in an incorrect capacity plan. To counteract this, a nearest neighbor algorithm may be used to impute a missing value to an acceptable number until a software or hardware corrective action may be taken to address the anomaly. Another example may involve missing upstream or downstream usage data for a given time period. One of the key tasks of a node may be to provide bandwidth capacity. Underreporting or overreporting the bandwidth capacity may also result in an incorrect capacity plan. Using a non-linear fit algorithm, the missing value may be imputed to an acceptable number until a software or hardware corrective action may be taken to address the anomaly. In some instances, a Winsorization technique may be applied to smooth out data. For example, surge usage in a particular geographical cluster in the case of popular events provides incorrect peaktime bandwidth usage reports. Algorithmically aligning to a generally acceptable demand may avoid capacity planners from overprovisioning network nodes.

Once the data is cleaned, clustering and forecasting may be performed. Clustering may involve grouping network elements (e.g., nodes) into groups based on the data received by each of the network elements. For example, network elements may be clustered based on projected growth rates in terms of particular metrics such as bandwidth usage. Network elements may also be clustered based on other factors, such as geographical location. In some instances, multiple iterations of clustering may be performed. Additionally, clustering may be performed both before and after the forecasting process described below. Forecasting may involve determining future projections for the network elements with respect to certain metrics associated with the elements. For example, forecasting may determine a projection of the bandwidth usage for a node in the network over a 10-year span. The forecasting may be performed based on the data received from the network elements, and may also potentially be performed based on one or more of the clustering outcomes. The forecasting may be based on dynamic time-warping that takes into account seasonality. The forecasting may also be univariant or multivariant. In some instances, multiple iterations of forecasting based on different types of statistical models may be performed, and metrics associated with each statistical model may be captured to determine the best overall model to utilize. For example, statistical models may include regression-based time series and smoothing models. Statistical models may also include supervised machine learning models (such as, ensemble learning, random forest, and gradient boosting, for example), and unsupervised machine learning (such as, Multilayer Perception (MLP) Extreme Learning Machine (ELM) Neural Networks, for example). For example, an error rate for each model may be determined, and the model associated with the lowest error rate may be selected. The error rate may be the same as the residual or the difference between a 'retained value' (or the predicted value) and a 'true value' (or the actual value). In this case, the actual(s) and predicted value(s) may be based on upstream and downstream load.

Once clustering and forecasting are performed, the determined outputs may be passed through a rules and/or optimization processes. The rules and/or optimization processes may take the outputs from the aforementioned processes, along with one or more rules, conditions, constraints, etc., and may determine one or more appropriate outputs in the form of indications of actions to be taken on the network. For example, an action may involve a change to be made to the network. More particularly, an action may, for example, involve upgrading a node to a newer technology based on a determination that the bandwidth utilization projection of the node may be excessively high in the future. In some instances, the rules process may be separate from the optimization process and may provide several outputs as options, whereas the optimization process may provide a single, most optimal output. In some instances, the optimization process may work in conjunction with the rules process in that the rules process provides an initial set of rules for the optimization process to work with, and over time the optimization process may ultimately supersede the rules process. That is, the optimization process may involve the use of machine learning, and the rules process may provide an initial set of rules by which the optimization process may be trained for future independent operation. However, in some instances, the rules process may supersede the optimization process as well.

The ultimate output of all of these operations may be in the form of an action to be taken with respect to the network and/or any individual elements on the network. For example, the action may involve performing a node split at a first node on the network and/or upgrading a second node to a different technology.

Example System Architecture

FIG. 1 depicts an example change to a network architecture 100 in accordance with one or more embodiments of the disclosure. In some embodiments, the network architecture 100 may represent a network that exists at a time T=1, which may represent the network at a first time. An example of the change to the network architecture 100 may be represented by the network architecture 110. The network architecture 110 may represent a network that exists at time T=1+X, which may represent the network at a second time after the first time. In an embodiment, there may be a node 102, which may implement aspects of the scheduling functionality described herein.

In some aspects, the node 102 above may include a regional or area headend/hub. The hub can receive programming that is encoded, modulated, and upconverted onto radio frequency (RF) carriers, combined onto a single electrical signal, and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

In an embodiment, there may be one or more network connections 103 (e.g., fiber connection, coaxial connection, etc.) connected to the node 102. The node 102 may further be connected to various nodes 104 (that is, both nodes 102 and 104 may be generally described as nodes, and may be the same or different types of network devices) through the one or more network connections 103, and may connect to various devices, for example, located at various households 106.

In an embodiment, data may be transmitted downstream from the node 102 to one or more customer premise devices (which may implement aspects of the scheduling functionality described herein) at homes 106 over-using the nodes 104. In an embodiment, as the data is transmitted downstream from the node 102 to one or more homes 106, the nodes 104 can potentially generate various impairments on the network. Alternatively or additionally, as the signals pass through from the node 102 to the nodes 104 over the network connections 103 and to the homes 106, the network connections 103 can cause the signals to undergo various impairments, for example, to the power spectral density of the signals. In an embodiment, the impairment can be due to attenuation on the network connections 103. In an embodiment, the impairments can lead to frequency distortions on the signals; for example, the higher frequency end of the signals may be attenuated. Accordingly, in an embodiment, one or more amplifiers (not shown) can be used to perform a gain on the attenuated signals. In an embodiment, the one or more amplifiers can be placed, for example, at one or more of the nodes 104 to perform the gain on the attenuated signals.

The network represented by the network architectures 100 and 110 may be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer premise device. In another aspect, a return-path or upstream signals can refer to information from the customer premise device to the headend/hub office. The forward-path and the return-path can be carried over the same coaxial cable in both directions between the node and the customer premise equipment.

In various aspects, the node 102 (e.g., headend) and/or the nodes 104 may include aspects of the functionality of the computing device 1900, as shown and described in connection with FIGS. 19A and/or 19B below. In particular, the node 102 (e.g., headend) and/or the nodes 104 may include or be in communication with, at least one or more processors 1904, memory 1908, and may include one or more interfaces 1922, including a communication interface (e.g., to communicate with between each other and with various customer premise equipment such as cable modems).

In an embodiment, the node 102 and the nodes 104 can take various measurements and track and store various types of data, for example, measurements to characterize one or more channels associated with signals received by the receiving device, and/or one or more measurements associated with he received signal from the transmitting device, including, but not limited to, signal-to-noise ratio (SNR) measurements, minimum end-of-line (MER) measurements, slopes measurements, amplitude measurements, ripple measurements, spike (for example, non-linear noise distortions) measurements, absolute received power per subcarrier measurements, error vector magnitude measurements, or any other type of data associated with the node and/or the network. Examples of other types of data that may be collected are presented with reference to FIGS. 3-7. The node 102 and/or nodes 104 may then transmit at least portions of the measurements in informational blocks, for example, as data packets, to any internal or external location (e.g., system 108 described below) for storage.

In some embodiments, network architecture 110 may represent a change to or updated version of the network architecture 100 optimized for a time T=1+X, which may represent a time subsequent to time T=1, which is associated with the original network architecture 100. As may be depicted in FIG. 1, the network architecture 110 may include some of the same elements or substantially the same elements as network architecture 100. For example, network architecture 110 may include a node 102, which may be, for example, a headend, one or more nodes 104 that are connected to the node 102 through one or more network connections 103, and one or more homes 106 with devices that are connected to the one or more nodes 104. In some embodiments, the devices within the homes 106 may also be nodes in either of architectures 100 or 110, or any other network architecture. That is, network architecture 110 may simply represent optimized changes to network architecture 100. In FIG. 1, example changes are depicted in the form of a node split 112 that takes place between two nodes 107 and 108. A second example change involves upgrading the technology of a particular node 109 from DOCSIS 3.0 to DOCSIS 3.1. Any type of technology change or upgrade may be performed in addition to a DOCSIS technology upgrade. For example, the node may be changed to a fiber connection instead of a coaxial DOCSIS connection. A third example change may involve adding a new node to the network architecture 110. For example, in network architecture 110, a new node 115 was added. A fourth example may involve adding an additional home 106 or other location that would be connected to the node, for example home 111 is added to the network architecture 110 in FIG. 1. These are merely examples of changes to the network architecture 110 from network architecture 100, and are not intended to be limiting. Any number of potential other changes may also be made to the network architecture 100 at time T=1+X as well, or in the alternative.

In some embodiments, the determination of changes from the network including the network architecture 100 to the network including the network architecture 110 may be performed by a system 108. The system may be, for example, a server or other device that may be managed by a third party, or may be managed by the same entity that manages the network 100, 110. In some instances, the functionality of the system 108 may be represented by the illustrative process flow 200 depicted in FIG. 2, for example. That is, the system 108 may output an indication of a change, or changes, to the network architecture 100 that may result in the network architecture 110 for optimization of the network 100 at a subsequent point in time. For example, in FIG. 1, the system 108 may have indicated that a node split should be performed at 112. Additionally, in some instances, the underlying hardware associated with the system 108 may be the same or similar to the hardware described with reference to the computing system in FIGS. 19A and/or 19B.

In some embodiments, any of the elements described with reference to FIG. 1 (e.g., any of the elements in the network architectures 100 and 110, such as the node 102 and/or nodes 104, the externals system 108, etc.) may be in communication with one another via one or more networks. The network may include, but is not limited to, any one or a combination of different types of suitable communications networks such as, for example, cable networks, public networks (e.g., the Internet), private networks, wireless networks, cellular networks, or any other suitable private and/or public networks. Further, the network may have any suitable communication range associated therewith and may include, for example, global networks (e.g., the Internet), metropolitan area networks (MANs), wide area networks (WANs), local area networks (LANs), or personal area networks (PANs). In addition, the network 112 may include any type of medium over which network traffic may be carried, including, but not limited to, coaxial cable, twisted-pair wire, optical fiber, a hybrid fiber-coaxial (HFC) medium, microwave terrestrial transceivers, radio frequency communication mediums, satellite communication mediums, or any combination thereof.

In some embodiments, the system 108 may receive via communication link 114 information pertaining to the network, for example, in the form of the network architecture 100 that exists at time T=1. This information may be received from the node 102, the nodes 104, or any other element within the network architecture 100, or even from the network itself. In some instances, the information received may be some or all of the data that is described with reference to FIG. 3. Additionally, the system 108 may receive data at 116 and 117 from other sources. For example, the system 108 may receive input file data 118 and configuration file data 120, and may also receive one or more rules 124. The rules may be received from a rules database, for example. The input file data 118, for example, may include at least information on how a particular node is valued. The configuration file data 120, for example, may include at least less time-sensitive information, such as opportunity cost and annual budget. Both the configuration file 120 and input file 118 data are described in more detail with reference to FIG. 3. Additionally, all of the data, including data pertaining to the network architecture 100, the input file data 118, the configuration file data 120, the rules 124, and any other data, may be received from any number of sources, which may be the same source or different sources. After receiving all of this data, the system 108 may process the data (e.g., as is described with reference to FIG. 2 or any of the other process flows and or methods described herein) and provide an output 126 in the form of a plan 128. The plan 128 may include an indication of one or more changes to be made to the network in the form of network architecture 100 that may result in the network architecture 110. For example, the plan 128 may indicate that original node 104 may be split into nodes 107 and 108, as depicted in network architecture 110, and when that change should optimally occur.

Those of skill in the art will appreciate that any of the components of the network architectures 100 and 110 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system 100, and the associated functionality that such components support, are merely illustrative and that some components may not be present or additional components may be provided in various embodiments. While various program modules have been depicted and described with respect to various illustrative components of the network architectures 100 and 110, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of skill in the art will appreciate that the illustrative network architectures 100 and 110 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative network architectures 100 and 110, or additional functionality.

Example Overall Process Flow

Figure 2:
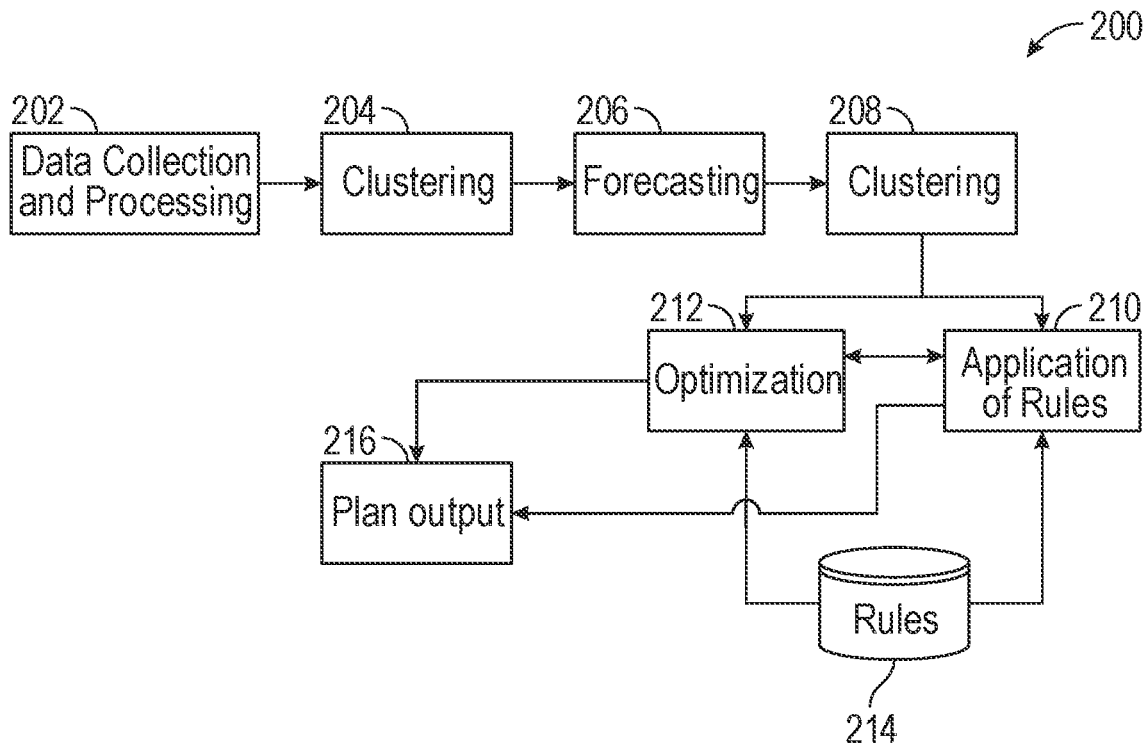
FIG. 2 illustrates an example process flow according to an embodiment of the disclosure.

FIG. 2 illustrates a flow diagram of an example process 200 in accordance with one or more embodiments of the disclosure. In some embodiments, the process may include a data block 202. The data collection and processing block 202 may involve receiving data regarding a node in a network, for example, any of the nodes 102 and 104 within the network depicted in either of network architectures 100 and 110 of FIG. 1. The data may be received from each of the individual network nodes, for example. That is, each of the nodes may provide any of the data that is described herein. In some embodiments, however, the data may also pertain to a group of nodes, or any one node may provide data about one or more different nodes. The data may include, for example, topology data, telemetry data, geographical data, and/or information included in configuration files and input files. The data may also include any other types of data. The data collection and processing block 202 may also involve processing of the data to clean the data and prepare the data for further use in subsequent blocks. The types of data received as well as the processing that is performed on the received data may be further described with reference to FIGS. 3-8. In particular, FIGS. 3-7 may describe the types of data received from each individual node, and FIG. 8 may describe the processing performed on the received data.

In some embodiments, the process 200 may include a first clustering block 204. The first clustering block 204 may involve clustering the nodes into groups based on the data received in the data collection and processing block 202. In some embodiments, the first clustering block 204 may also be a part of the forecasting block 206. That is, the first clustering block 204 may be considered a pre-forecasting clustering of nodes. For example, the clustering may involve grouping the nodes by determined growth rates of the nodes. The growth rates of the nodes may be separated into one or more categories, including at least high growth rate, positive growth rate, and negative growth rate. Other examples of growth rate categories may be depicted with reference to Table 6 below. Once the nodes are clustered into respective growth rate groupings, this clustering information may be used during the forecasting block 206.

In some embodiments, the process may include a forecasting block 206. The forecasting block 206 may be responsible for determining a future projection of a metric of the network or any elements of the network, such as, for example, individual network nodes at a given point in time. For example, the forecasting block 206 may determine a projection for the bandwidth usage of a particular node 10 years in the future. In some instances, the forecasting block 206 may determine the projected metric at various points in time up until a specified point in time. For example, if the projection is for 10 years into the future, the forecasting block 206 may provide a set of data points at various intervals between the current time and 10 years in the future. The forecasting block 206 may perform such forecasting based on the data received in the data collection and processing block 202, and also potentially based on the clustering performed in the clustering block 204. Even though, in some cases, the forecasting block 206 may occur subsequent to the clustering block 204, the forecasting may nonetheless be performed on individual elements within the network, such as on individual nodes. That is, even though nodes may be clustered in the clustering block 204, the forecasting block 206 may still perform clustering on the individual nodes rather than the cluster of nodes. Instead, each node may include information about the cluster it was assigned, and this information may be used by the forecasting block 206 in performing forecasting. In some instances, however, the forecasting block 206 may perform forecasting on groups of nodes, including a cluster of nodes, or an entire network in general.

Figure 11:
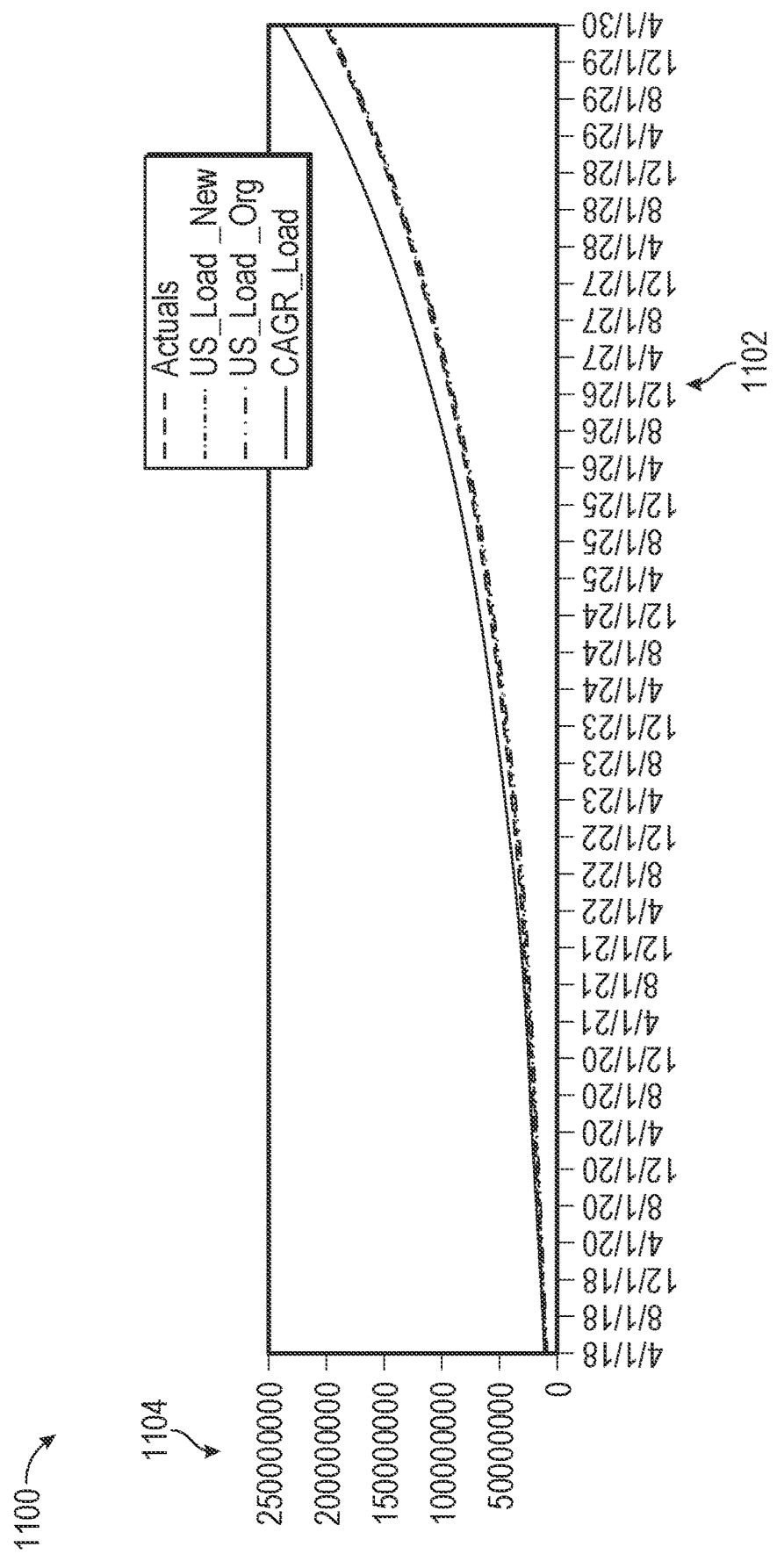
FIG. 11 illustrates an example forecasting output plot, according to an embodiment of the disclosure.

In some embodiments, the process may include a second clustering block 208. The second clustering block 208 may involve performing a second round of clustering that is different than the first round of clustering performed by the first clustering block 204. The second clustering block 208 may involve the use of mixes and weighting instead of growth rates to perform the clustering. That is, the first clustering may be based on growth rate projections, and the second clustering be based on different and/or additional attributes. In one example, as is depicted in FIG. 11, the clustering may be performed based on location and/or technology associated with the nodes (e.g., if the node is configured for DOCSIS 3.0, DOCSIS 3.1, PON, etc.). In some instances, the mixes may involve one or more of at least any of the following dimensions: time to congest (TTC), distance based on latitude and longitude, costs to split, and value of the node (e.g., based on return on investment). For example, a mix of TTC and Latitude/Longitude, or TTC and product value, or all dimensions may be used. With regards to weightings, various weight factors may be applied to these mixes to achieve various scenario-based clusters. When adding multiple dimensions, the weightings may be used to provide an importance by applying a value (for example, 1-100%). For example, if TTC, costs, and value are selected as dimensions for the mixes, and TTC is determined to be the most important dimensions with value ad cost equally as important, the weights of 50%, 25%, and 25% may be applied, with TTC assigned 50%, so that the nodes congesting in closer intervals may be clustered with a higher weighting, or importance).

In some embodiments, the process may include an application of a rules block 210. The application of rules block 210 may include receiving as inputs the results of at least the forecasting block 206 and second clustering block 208. The application of the rules block 210 may also include receiving, or having stored, various rules 214, which may be in the form of business rules pertaining to the network. FIG. 2 depicts the rules as being received from an external source, however, the rules may also be stored at the application of rules block 210, or even at an optimization block 212, or at any other location. The ruleset as a whole may be derived from these sources depending on need—that is, the internal ruleset may serve as a baseline, simple behavior of the model, while external sources may provide input parameters that alter thresholds or triggers for dynamic logic, and more complex requirements may be resolved through more integrated means such as goal-seeking optimization algorithms. Additionally, the rules may be prioritized. For example, node splitting may be valued as more important than spectrum bandwidth alterations, and thus a rule that results in a node split may be given more weight in the application of rules block 210 than a rule that results in spectrum bandwidth alterations. The application of rules block 210 may be used to determine options for changes to be made to the network (e.g., if a node originally starts with a DOCSIS 3.1 technology, then a change may involve changing the technology to FTTP or performing a node split, such as a N+0 or N+X node split). These options may be determined by applying any of the rules used to forecasting and/or clustering from the forecasting block 206 and/or the second clustering block 208. The application of rules block 210 may perform network change determinations on a node-by-node basis, but actions may also be taken at the cluster level or an even higher level, such as when all nodes in a particular facility require the same action. The application of rules block 210, and examples of rules engine logical flows may be depicted with respect to FIGS. 14 and 15.

In some instances, the application of rules block 210 may simply serve as an initial set of rules for the optimization block 212 described below. That is, the optimization block 212 may require initial input from the application of rules block 210, but may eventually supersede the application of rules block 210 as the primary decision-maker in terms of network changes. In some embodiments, the application of rules block 210 may alternatively supersede the optimization block 210. Additionally, the application of rules block 210 and optimization block 212 described below may operate in parallel, or may not necessarily be depicted in sequential order.

In some embodiments, as noted above, the process may include the optimization block 212. The optimization block 212 may work in conjunction with the application of rules block 210 to provide an indication of a change to be made to the network (e.g., a change to be made to an individual node in the network, such as a technology upgrade or a node split). In some instances, the optimization block 212 may differ from the application of rules block 210 in that a single indication of a change is provided. That is, the application of rules block 210 may provide multiple options or plans for changes to be made (for example, as depicted in Table 8 below), but the optimization block 212 may provide the single most optimal change. In other words, the optimization block 212 may involve receiving a list of rules 214, and based on those constraints and conditions defined by the rules, as well as outputs from at least the forecasting block 206 and the second clustering block 208, determining an optimal change or network configuration plan. Thus, the optimization block 212 may involve constraint programming. The rules may serve to provide limitations to the optimization block 212 such that an option is not recommended that would not be feasible in the network (e.g., install an entirely new type of technology that would not fit with the rest of the network). The rules 214 may also represent the preferences of the entity managing the network and/or any number of other parameters, such as budgeting limitations. As mentioned previously, the optimization block 212 may initially require the rules input of the application of rules block 210, but may eventually operate independently without the use of the application of rules block 210. This may be because the optimization block 212 may involve the use of artificial intelligence, such as machine learning or neural networks. The rules associated with the application of rules block 210 may be used to initially train the optimization block 212 until the optimization block 212 is able to make optimal decisions without the assistance of the application of rules block 210.

In some embodiments, the process may include a plan block 216. The plan block 216 may include receiving an output from one or both of the application of rules block 210 and the optimization block 212. That is, the plan block 216 involves receiving a plan of action for each individual node (or a group of nodes) in the network. As non-limiting examples, the plan of action may involve upgrading or changing the technology of the node (e.g., change from DOCSIS 3.0 to DOCSIS 3.1), may involve widening the spectrum associated with the node, or may involve splitting the node.

Example Data Capture and Processing

Figure 3:
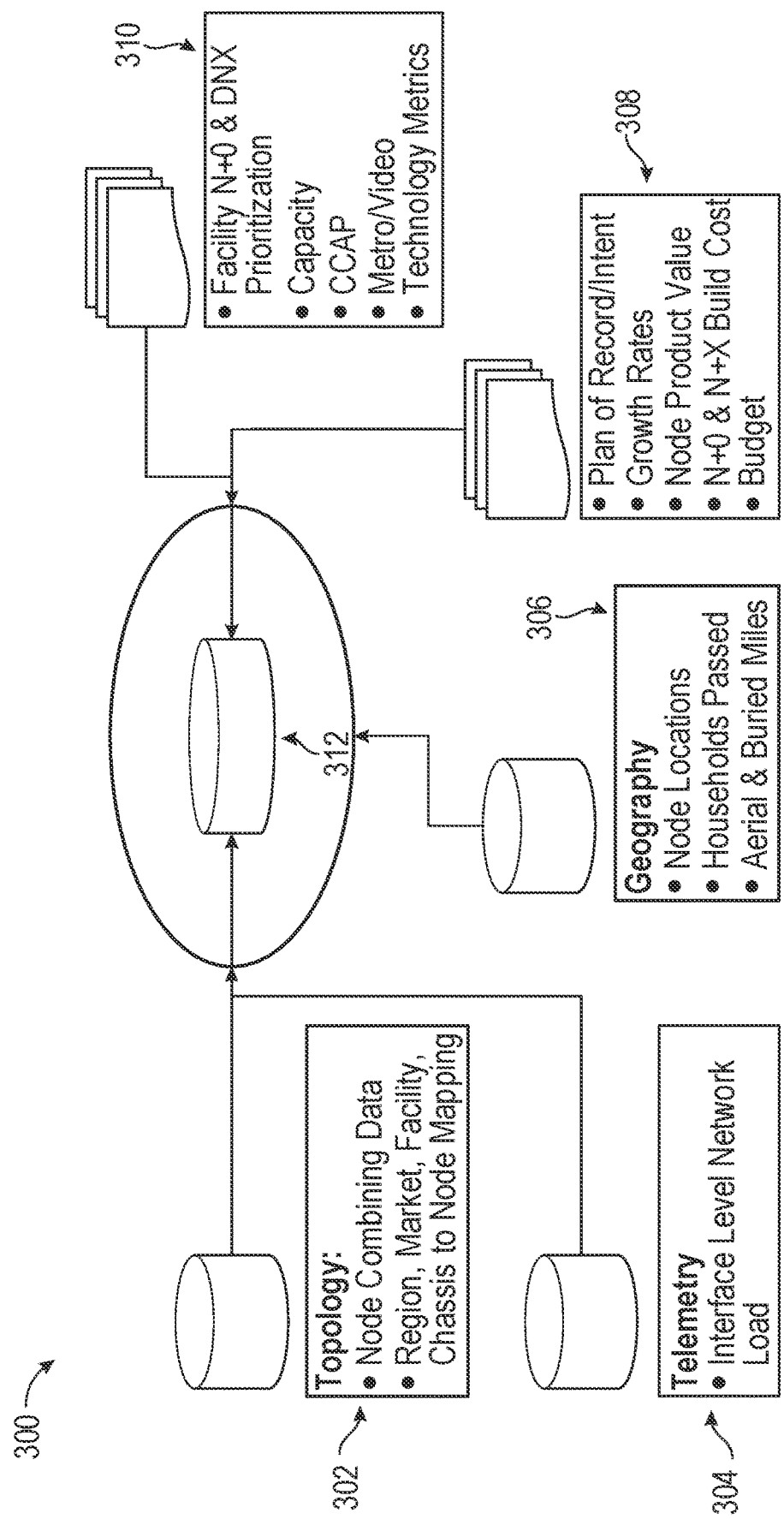
FIG. 3 illustrates an example of data capture architecture according to an embodiment of the disclosure.

FIG. 3 illustrates a flow diagram 300 of an example data capture architecture in accordance with one or more embodiments of the disclosure. In some embodiments, the flow diagram 300 may represent different types of data (e.g., 302, 304, 306, 308, 310, etc.) that may be received and/or provided. The data may be provided to an internal and/or external location 312, which may be, for example, the system 108. In some instances, the data may be provided by each individual node (for example nodes 102 and/or nodes 104 depicted with reference to FIG. 1), that is, each individual node may provide its own ENCP (Enterprise Node Combining Plan) data 302, TNPM (Tivoli Netcool Performance Manager) data 304, GNIS (Geospatial Network Inventory System) data 306, and may also provide input files 308 and configuration files 310. In some instances, however, each individual node may only provide the ENCP data 302, TNPM data 304, GNIS data 306, and the input files 308 and configuration files 310 may be obtained from other sources. Additionally, such data may be obtained for groups of nodes, and particular nodes can provide such information about other nodes. Examples of data that a given node would provide for each of these various types of data are provided below. It should be noted that these are just examples of types of data that may be provided, and that any other data is also a possibility to be included. Additionally, any types of data depicted in FIG. 3 are also merely examples and should not be taken as limiting.

In some embodiments, the ENCP data 302 may include topology information for the node providing the data. For example, the ENCP data 302 may include region, market, facility, and chassis to node relationship data. FIG. 4 depicts a table 400, including example ENCP data 302 for various nodes (e.g., node "4038A"). In some cases, each individual row 408 in the table depicted in FIG. 4 may represent a single set of information associated with a node. In some embodiments, multiple rows may be associated with a single node. For example, ENCP data 302 may include a sub-region description, a site description, a headend identifier, a facility description, a node name, a host name, a device type, a service type, a channel or interface, a channel type, an OFDM enablement boolean, a slot number, and a card number. To provide a few more detailed examples, sub-region description data may be associated with column 402, and may refer to the region in which the node is located. The site description may be located in column 404 and may provide more local geographic information, such as county information. The headend identifier may be found in column 406 and may serve to identify the particular headend associated with the node. The node name may be found in column 408 and may identify the node associated with the data found in the row (e.g., row 408).

In some embodiments, the TNPM data 304 may include telemetry data for a particular node. The telemetry data, may include interface-level network load information for the node, that is, in a single pipeline, how much data is being used upstream and/or downstream. For example, the node may provide bandwidth information associated with a timestamp. FIGS. 5A-5B depicts tables 502 and 513 including example TNPM data 502 and 513 for various nodes. For example, TNPM data 304 may include a resource ID, a report start date, a report end date, an interface name, a unique name of a given chassis, interface details, speed information, a max percentage utilization, an average utilization, a maximum RF channel utilization percentage, an average RF channel utilization percentage, a $95^{th}$ percentile RF channel utilization, a date, and a system name. To provide a few more detailed examples, the resource ID may represent the ID of the node and may be found in column 504. The report start date and report end date may be found in columns 506 and 508, respectively, and may provide the period of time during which data found within the other columns was collected (e.g., the maximum percentage utilization). The maximum percentage utilization may be found in 510 and may represent the maximum bandwidth utilization the node experienced during the reporting period. Similarly, the average percentage utilization may be found in column 512 and may represent the average bandwidth utilization the node experienced during the reporting period. The $95^{th}$ percentile RF channel utilization may represent the $95^{th}$ percentile of utilization over the reporting period and may be found in column 514.

In some embodiments, GNIS data 306 may include meta-data GNIS to the node providing the data. FIGS. 6A-6B depict tables 602 and 620, including example GNIS data. GNIS may be an inventory system used to design and track network assets. For example, the meta-data may include a market 604, a node identifier 606 (e.g., "name"), the geographical location of the node (e.g., "market," 604 "hub," 608 and "city" 609), the number of households passed 610, the number of residential units 612, commercial units 614, vacant units 618, and multi-dwelling units (MDUs) 616 covered by the node. In some cases, each individual row in the table depicted in FIG. 6A or 6B may represent a single set of information associated with a node. In some embodiments, multiple rows may be associated with a single node. For example, the second row of FIG. 6A may represent GNIS data 306 obtained from a first node with a name of "F-32," a location of "Baton Rouge," and a given number of household passings, including residential, commercial, MDU, and vacant. Likewise, the third row may represent GNIS data 306 obtained from a second node with a name of "F-41."

The GNIS data 306 may also include data such as weekly upstream and downstream bandwidth utilization, the number of aerial and/or buried miles, and other types of information. Examples of such data may be presented below in FIG. 6B. For example, FIG. 6B displays the name of each individual node (e.g., "F-32") (in the particular example provided in FIG. 6B, data a single node, "F-32" is tracked over time. The node event data consolidated by week is shown in the "dt" column. For example, the second row may represent data associated with the week of May 6, 2018, and so on). Other examples of types of data that may be provided by a node may include the current node technology (e.g., DOCSIS 3.0, 3.1, PON, etc.), the node upstream (us), and/or downstream (ds) load computed to the 95$^{th}$ percentile, and the node's latitude (lat) and longitude (lon). This is only an exemplification of the types of GNIS data 306 that may exist, and any number of possibilities are available, even beyond the data types listed in FIGS. 6A and 6B.

In some embodiments, the input files may provide information on how a particular node is valued to a business. In some instances, this information may be more time-sensitive and scenario-based information than the configuration files. The velocity of network entity data in input files may be slower moving compared to configuration files used for scenario analysis. Scenario analysis (for example, associated with configuration files may involve varied factors, such as opportunity cost, annual budget, in some instances, the input files may be obtained from a source other than the node itself, for example, from the entity responsible for managing the network. However, in some instances, the input files may also be stored at the individual nodes. The input files, for example, may include information such as a business plan of record and/or intent, growth rates, product node values, N+0 and N+X build costs, and budget, among other information. In some instances, an N+0 split may be more costly and a multi-node split, and in some instances, an N+X split may be a single node split alone. The value after the "+" in "N+X" or "N+0" may represent the number of amplifiers required to get to the home or the premise. For example, N+0 may involve splitting the node in such an extent that each node is so close to an associated home that no amplifiers are required. Examples of such information included in input files may be presented below in Tables 1-5.

Table 1 may provide an example of annual budget information that may be included in an input file. Table 1 may depict the market, year, number of nodes budgeted to be constructed, and the total cost associated with such construction.

TABLE 1

| market | year | n0_construction | total cost |
|---|---|---|---|
| Alabama | 2019 | 184 | 32.47 |
| Alabama | 2020 | 672 | 51.83 |
| Alabama | 2021 | 356 | 59.46 |
| Alabama | 2022 | 122 | 42.19 |
| Alabama | 2019 | 111 | 32.64 |
| Alabama | 2020 | 251 | 70.6 |
| Alabama | 2021 | 468 | 120.2 |

Table 2 may provide an example of node build cost information that may be included within an input file. The example provided in Table 2 may include information such as the market code, the facility abbreviation, the node description (e.g., node name or identifier), and the calculated costs for node splits and N+0 actions.

TABLE 2

| market_code | location abb | node desc | action_cnt | n0_build_cost | nx build cost | non_build_cost |
|---|---|---|---|---|---|---|
| Ga | BEE | 0978H | null | 333377.88 | 53858.23 | 40620.3 |
| Ga | BEE | 0978H | null | 283799.2 | 55488.23 | 40620.3 |
| Ga | BEE | 0978H | null | 360916.15 | 56278.23 | 40620.3 |
| Ga | BEE | 0978H | null | 244464.09 | 55018.23 | 40620.3 |
| Ga | BEE | 0978H | null | 231549.86 | 53408.23 | 40620.3 |
| Ga | BEE | 0978H | null | 223416.99 | 53218.23 | 40620.3 |
| Ga | BEE | 0978H | null | 184009.95 | 54398.23 | 40620.3 |
| Ga | BEE | 0978H | null | 301684.81 | 55738.23 | 40620.3 |
| Ga | BEE | 0978H | null | 242749.64 | 56068.23 | 40620.3 |
| Ga | BEE | 0978H | null | 293024.54 | 55358.23 | 40620.3 |
| Ga | BEE | 0978H | null | 84015.64 | 52228.23 | 40620.3 |

Table 3 may provide an example of growth rate information that may be included within an input file. The example provided in Table 3 includes the market, downstream and upstream growth rates, version name, and additional information pertaining to versioning and traceability. The version name may be an actual scenario that is being run (so if changes are made to the forecast or growth rates, different scenarios can be tracked).

TABLE 3

| down-markets | stream | upstream | version name | row id | load time | version id |
|---|---|---|---|---|---|---|
| Ma | 0.32 | 0.26 | Scenario-15.61 | 2 | 10:47.0 | 16 |
| Ma | 0.314 | 0.2453 | Scenario-15.61 | 3 | 10:47.0 | 16 |
| Ma | 0.342 | 0.235 | Scenario-15.61 | 4 | 10:47.0 | 16 |
| Ma | 0.328 | 0.2347 | Scenario-15.61 | 5 | 10:47.0 | 16 |
| Ma | 0.32 | 0.2511 | Scenario-15.61 | 6 | 10:47.0 | 16 |
| Ma | 0.28 | 0.2166 | Scenario-15.61 | 7 | 10:47.0 | 16 |
| Ma | 0.307 | 0.2337 | Scenario-15.61 | 8 | 10:47.0 | 16 |
| Ma | 0.337 | 0.2897 | Scenario-15.61 | 9 | 10:47.0 | 16 |
| Ma | 0.368 | 0.3154 | Scenario-15.61 | 10 | 10:47.0 | 16 |
| Ma | 0.313 | 0.2484 | Scenario-15.61 | 11 | 10:47.0 | 16 |
| Ma | 0.224 | 0.1847 | Scenario-15.61 | 12 | 10:47.0 | 16 |
| Ma | 0.309 | 0.2246 | Scenario-15.61 | 13 | 10:47.0 | 16 |
| Ma | 0.33 | 0.2291 | Scenario-15.61 | 14 | 10:47.0 | 16 |
| Ma | 0.317 | 0.2128 | Scenario-15.61 | 15 | 10:47.0 | 16 |
| Ma | 0.387 | 0.2955 | Scenario-15.61 | 16 | 10:47.0 | 16 |

Table 4 may provide an example of product value information that may be included within an input file. The example provided in Table 4 may include the site identifier for the node (e.g., the location of the node), the node number (for example, this may be the name of the node as it is recorded in systems and, in some instances, can be repeated across markets but not in the same market), node identifier (for example, this may be a concatenated key (concatenation of site_id and node) as to add a unique value for the node, a description of the location of the node, a value assigned to the node, a rank assigned to the node (e.g., a higher value rank may indicate the node's relative importance when compared to other nodes), an active subscriber counts divided into residential and corporate business (cb), a summation of the two, and a breakdown of the total node value by these respective divisions.

TABLE 4

| site_id | node | sub_system_identifier | dose | node_value | node_rank | res_subs | cb_subs | total_subs | residential_value | cb_value |
|---|---|---|---|---|---|---|---|---|---|---|
| 406 | 981 | 65465463 | Atlanta | 262 | 8488 | 27 | 0 | 27 | 262 | 0 |
| 406 | 35229 | 65465463 | Atlanta | 1265 | 9925 | 145 | 0 | 145 | 1265 | 0 |
| 406 | T02714 | 65465463 | Atlanta | 2801 | 11831 | 408 | 52 | 460 | 2801 | 0 |
| 406 | 8245 | 65465463 | Atlanta | 1266 | 18005 | 212 | 0 | 212 | 1266 | 0 |
| 406 | T30039 | 65465463 | Atlanta | 1250 | 19354 | 198 | 53 | 251 | 1250 | 0 |
| 406 | 9 | 65465463 | Atlanta | 5531 | 11708 | 691 | 43 | 734 | 5531 | 0 |
| 406 | 52 | 65465463 | Atlanta | 4057 | 14182 | 466 | 47 | 513 | 4057 | 0 |
| 406 | 90 | 65465463 | Atlanta | 1535 | 19819 | 236 | 3 | 239 | 1535 | 0 |
| 406 | 62 | 65465463 | Atlanta | 2272 | 22007 | 408 | 28 | 436 | 2272 | 0 |
| 406 | 632 | 65465463 | Atlanta | 33542 | 3337 | 603 | 11 | 614 | 33542 | 0 |
| 406 | 555 | 65465463 | Atlanta | 43766 | 2230 | 603 | 12 | 615 | 43766 | 0 |
| 406 | 618 | 65465463 | Atlanta | 23096 | 3075 | 359 | 0 | 359 | 23096 | 0 |
| 406 | 490 | 65465463 | Atlanta | 27748 | 4115 | 489 | 23 | 512 | 27748 | 0 |
| 406 | 562 | 65465463 | Atlanta | 36620 | 3351 | 509 | 34 | 543 | 36620 | 0 |
| 406 | 60 | 65465463 | Atlanta | 31472 | 3309 | 465 | 38 | 503 | 31472 | 0 |

Table 5 may provide an example of plan of intent information that may be included within an input file. The columns in Table 5 may include the node identifier, the node's market code, the projected completion date of the planned action, the type of action, and metadata associated with table versioning such as descriptive version name, row number, timestamp of when the data was loaded, and unique version ID.

TABLE 5

| node_id | market | date_action | action_type | version_name | row_id | load_time | version_id |
|---|---|---|---|---|---|---|---|
| 7694 | Tx | Dec. 31, 2017 | NS1 | 1 | 4 | 38:22.0 | 3 |
| 7694 | Tx | Dec. 31, 2017 | NS1 | 1 | 5 | 38:22.0 | 3 |
| 7694 | Tx | Dec. 31, 2017 | NS1 | 1 | 6 | 38:22.0 | 3 |
| 7694 | Tx | Dec. 31, 2017 | NS1 | 1 | 7 | 38:22.0 | 3 |
| 7694 | Tx | Dec. 31, 2017 | NS1 | 1 | 8 | 38:22.0 | 3 |
| 7694 | Tx | Dec. 31, 2017 | NS1 | 1 | 9 | 38:22.0 | 3 |
| 7694 | Tx | Dec. 31, 2017 | NS1 | 1 | 10 | 38:22.0 | 3 |
| 7694 | Tx | Dec. 31, 2017 | NS1 | 1 | 11 | 38:22.0 | 3 |
| 7694 | Tx | Dec. 31, 2017 | NS1 | 1 | 12 | 38:22.0 | 3 |
| 7694 | Tx | Dec. 31, 2017 | NS1 | 1 | 13 | 38:22.0 | 3 |
| 7694 | Tx | Dec. 31, 2017 | NS1 | 1 | 14 | 38:22.0 | 3 |
| 7694 | Tx | Dec. 31, 2017 | NS1 | 1 | 15 | 38:22.0 | 3 |
| 7694 | Tx | Dec. 31, 2017 | NS1 | 1 | 16 | 38:22.0 | 3 |

TABLE 5-continued

| node_id | market | date_action | action_type | version_name | row_id | load_time | version_id |
|---|---|---|---|---|---|---|---|
| 7694 | Tx | Dec. 31, 2017 | NS1 | 1 | 17 | 38:22.0 | 3 |
| 7694 | Tx | Dec. 31, 2017 | NS1 | 1 | 18 | 38:22.0 | 3 |

In some embodiments, the configuration files may include information on the network (e.g., the network associated with network architectures 100 and 110 as depicted in FIG. 1) and business policies associated with the network. Examples of information included in configuration files may be found in FIG. 7. The configuration files may differ from the input files in that the configuration files include information that may not be as time-sensitive as the input files.

It should be noted that although data in FIGS. 4-7 are depicted in specific tables in specific orders, these are merely examples and not intended to be limiting. Any of the data may be provided in any form or fashion and in any order.

Figure 8:
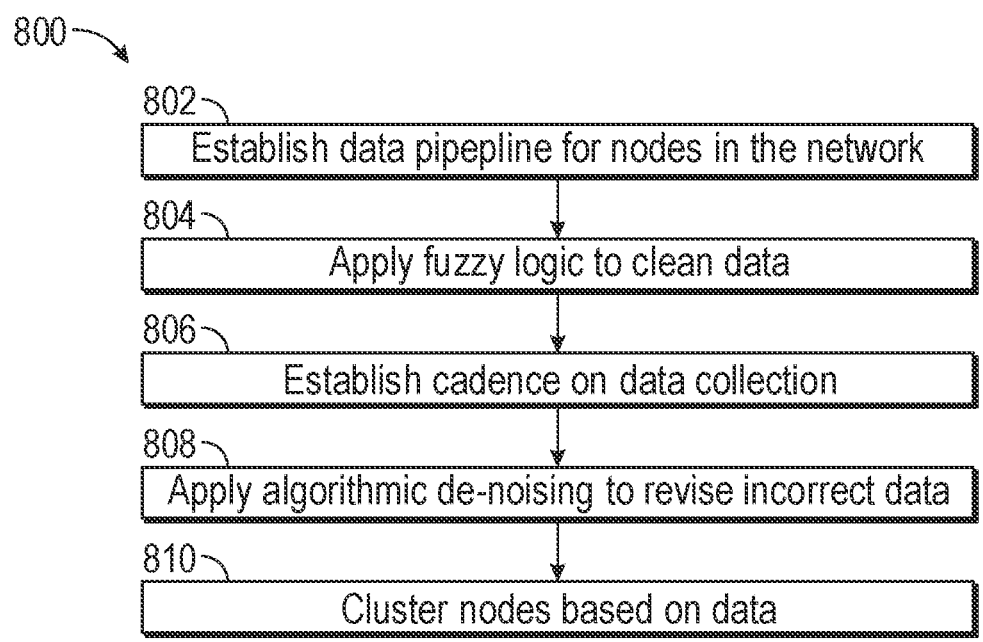
FIG. 8 illustrates an example of data capture and processing flow, according to an embodiment of the disclosure.

FIG. 8 illustrates an example data capture and processing process 800 flow according to an embodiment of the disclosure. The data capture and processing process 800 may represent a process flow for capturing the example data provided in FIGS. 4-7 (or any other data) and any associated descriptions and processing the data so that it may be properly used in any of the other processes and/or methods described herein. For example, by the system 108 as depicted with reference to FIG. 1. This may be necessary because the data received from the nodes and/or any other sources may not be in optimal form for processing by the tool. As one non-limiting example, the nodes may provide particular types of data with a zero value as "NULL," where a tool may only be able to recognize zero values that are represented with a "0," so the NULL values would need to be cleaned and converted to "0."

In some embodiments, the process 800 may include a block 802, including establishing a data pipeline for nodes in the network. Establishing the data pipeline may involve identifying current and past states of the network. Establishing the data pipeline may also involve determining a desired method of reporting data to be used by each node (for example, reporting topology, telemetry, geography data) and also various information that may be included in input and/or configuration files. In other words, how data should be reported and how different layers of the network are aggregated. Such data may be provided at the node level (e.g., each node may provide its own set of unique data) or any other level (e.g., network level).

In some embodiments, the process may include a block 804, including applying fuzzy logic. In some instances, once the data pipelines are established, and data begins to flow from each of the nodes and any other sources of information, it may be crucial that the data is able to be recognized and comprehended once it is received. For example, a node might provide its identifier (e.g., name) in the form "N0154," which may need to be understood to represent node number 154. Thus, fuzzy logic may be used to be able to receive "N0154" as an input and determine that this data represents a node identifier for node number 154. The fuzzy logic, in some instances, may be implemented in the form of machine learning algorithms.

In some embodiments, the process may include a block 806, including establishing cadence on data collection. The cadence on the data collection may involve determining the quality of the data being received from the nodes and/or any other sources. For example, the cadence may involve determining the frequency at which data is being provided and the times at which the data is being provided. This information may be compared to a predetermined set of parameters to determine whether the data is being supplied at the appropriate intervals. For example, the parameter may indicate that data is supposed to be provided by node A every week, but in reality, the data is only being provided every month, or not at all. This may indicate an issue with node A or an issue with the instructions used to elicit node A to provide data on a weekly basis, for example.

In some embodiments, the process 800 may include a block 808, including applying algorithmic de-noising to revise incorrect data. The algorithmic de-noising may involve determining abnormalities in data reporting. In some instances, algorithmic de-noising may address scenarios where one or more nodes are underreporting or overreporting any data. One example of such de-noising may include imputation applied to infer missing values for households served by a given node. The number of households served may be a key indicator for capacity planning and underreporting or overreporting the number of house-holds served by a given node may result in an incorrect capacity plan. To counteract this, a nearest neighbor algorithm may be used to impute a missing value to an acceptable number until a software or hardware corrective action may be taken to address the anomaly. Another example may involve missing upstream or downstream usage data for a given time period. One of the key tasks of a node may be to provide bandwidth capacity. Underreporting or overreporting the bandwidth capacity may also deduce an incorrect capacity plan. Using a non-linear fit algorithm, the missing value may be imputed to an acceptable number until a software or hardware corrective action may be taken to address the anomaly. In some instances, a Winsorization technique may be applied to smooth out extreme spurious data. For example, surge usage in a particular geographical cluster in case of popular events provides incorrect peak-time bandwidth usage reports. Algorithmically aligning to a generally acceptable demand may avoid capacity planners from overprovisioning network nodes.

In some embodiments, the process may include a block 810, including clustering nodes based on data. The clustering process of block 810 may involve grouping the nodes based on the data received during data capturing and processing (tie back to the earlier crap). The grouping of the nodes may be performed based on the cluster groups identified below in Table 6. The groupings depicted in Table 6 may be based on the growth projections of the node, which may be in terms of the bandwidth utilization of the node. The example groupings provided in Table 6 may include, for example, negative growth rate nodes and positive growth rate nodes (low-norm, normal, high-norm, etc.). Table 6 also includes an example number of nodes included in each grouping, the percentage of the total number of nodes that the particular group includes, and the minimum, median, and maximum growth rates (CAGR) associated with each of the cluster groupings. For example, the "normal" cluster has an annual minimum growth rate of 0.2158, a median annual growth rate of 0.2603, and a maximum annual growth rate of 0.3268. Upon categorization of each node into a particular cluster, the node may store information about the cluster it is grouped into.

TABLE 6

| Clust Groups | n-Node | % of total | Min(1 yr CAGR) | MED(1 yr CAGR) | Max(1 yr CAGR) |
|---|---|---|---|---|---|
| Splits | 276 | 1.71% | −0.8863 | −0.40445 | −0.2526 |
| Negative | 275 | 1.70% | −0.2504 | −0.1513 | −0.0913 |
| Pretty Flat | 835 | 5.17% | −0.0904 | 0 | 0.09 |
| Low-Norm | 6926 | 42.91% | 0.0901 | 0.162 | 0.2157 |
| Normal | 5757 | 35.67% | 0.2158 | 0.2603 | 0.3268 |
| High-Norm | 1740 | 10.78% | 0.3271 | 0.3814 | 0.5049 |
| High | 294 | 1.82% | 0.5059 | 0.5694 | 0.8386 |
| Really High | 28 | 0.17% | 0.8594 | 1.07485 | 1.6692 |
| Ummmm | 7 | 0.04% | 2.0806 | 2.3263 | 3.6736 |
| WOW | 1 | 0.01% | 7.7101 | 7.7101 | 7.7101 |

Figure 9:
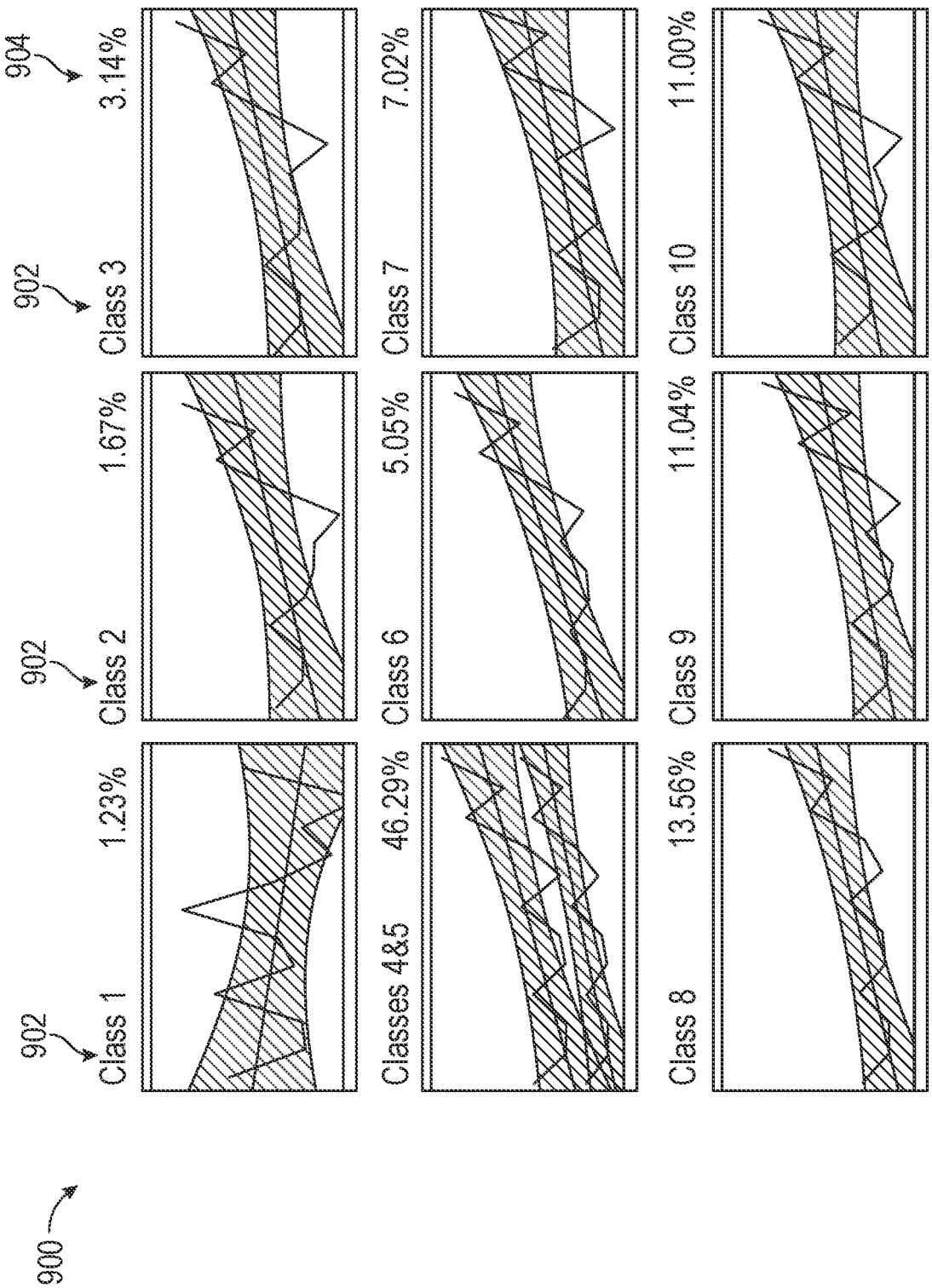
FIG. 9 illustrates an example of clustering plots, according to an embodiment of the disclosure.

FIG. 9 illustrates an example of clustering plots 900 according to an embodiment of the disclosure. In some instances, the clustering plots 900 may represent aggregated examples of the shape and slope of different node clusters designated into different classes 902. In some instances, each of the clustering plots 900 may depict seasonality characteristics as the x-axis of the plots may represent time (for example, in months). The y-axis, as an example, may include information about metrics associated with the nodes, such as bandwidth demand at the node. The clustering plots 900 may also include an indication of a percentage 904 of the total node population that the nodes in the particular cluster take up. For example, 'Class 1' may include nodes of negative growth and account for about 1.23% of the total node population. As another example, 'Class 2' and 'Class 6' may be similar in slope but may include differing 'peaks and valleys' of the shape of the seasonal aspect. 'Class 2', in this case may have a large dip in an $8^{th}$ month, where 'Class 6' dips, but not as pronounced. As another example, Classes 4 and 5, combined into a single graph, may have near-identical shapes, but grow at slightly differing rates and on different scales.

Example Forecasting Process

Figure 10:
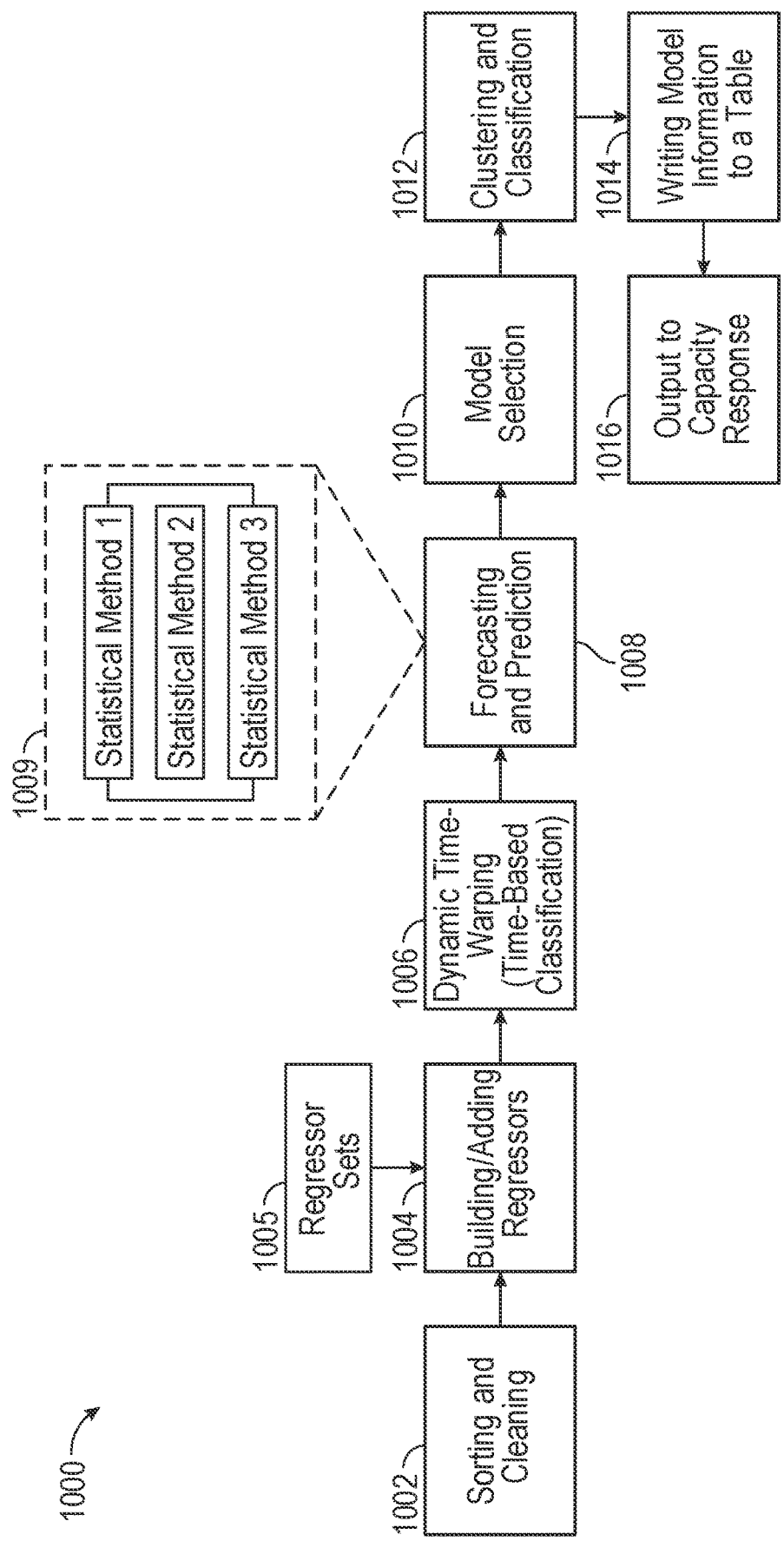
FIG. 10 illustrates an example forecasting process flow, according to an embodiment of the disclosure.

FIG. 10 illustrates an example forecasting process 1000 flow according to an embodiment of the disclosure. In some embodiments, the forecasting process 1000 may include a block 1002, including sorting and cleaning. The sorting and cleaning block may involve joining historical and recent data from two different sources to provide a longer and more stable forecast. After this data is read, it may be sorted. It may be desirable for node level data to be intact and ordered by node. The dates may also need to be in order for serially correlated data. After the data is sorted, it may be cleaned. Cleaning the data may involve, for example, ensuring that all date series are completed (e.g., missing dates are added and NULL values are assigned for the load data associated with those dates). Cleaning the data may also involve replacing all "0" values received with "NULL." Cleaning the data may also involve taking all of the NULL values and imputing them using a linear function to keep underlying trends intact. Cleaning the data may also involve flagging any data issues (e.g., repeated data from the nearest neighbor imputations) and/or calculating rates of increase and/or decrease from month to month.

In some embodiments, the forecasting process 1000 may include a block 1004, including building and adding regressors. Regressors may add information about predicted, dependent, variables. That is, regressors may address a variation in a statistical model as having a relationship with the predicted value so that the predicted value is dependent on the regressors (e.g., with an increase in 'x' there may be exhibited a positive increase of 'y' by a measurable percent). As an example, for node-level load growth, regressors may include houses passed per-node, the customers per-node, and plan to incorporate construction permits on nodes, demographics per-node. Using the aforementioned data issues determined in block 1002, which may be abnormalities in the data, time-based regressors 1005 may be added for week-of-month, month-of-year, and year. Level-shifts may be identified using the percentage difference calculation described with reference to block 1002 (e.g., calculating rates of increase and/or decrease from month to month) and may also be identified using one-hot encoding. In some instances, the regressors 1005 may also include other external regressors, such as customer counts, value per-node information, number of commercial passings of the node, and socioeconomic factors. Once the regressors 1005 are applied, a clustering may be performed based on the slopes. The clustering described here may be the same as the clustering described with reference to Table 6. In some instances, this may be a first round of clustering, and a second round of clustering may be performed after the forecasting and prediction block 1008 described below.

In some embodiments, the forecasting process 1000 may include a block 1006 including performing dynamic time-warping (time-based classification). Dynamic time-warping may be a time series comparison technique. In some instances, the dynamic time-warping may involve evaluating components of seasonality and/or periodicity as well as the slope of the curve (which may, for example, be a curve based on the forecasted bandwidth usage of a node). After scaling the data using a piece-wise regression. The coefficients of the model may then be grouped using clustering methods such as K-means and hierarchical methods, such as ward, average, complete, and centroid.

In some embodiments, the forecasting process 1000 may include a block 1008, including forecasting and prediction. Forecasting may involve calculating weekly and monthly (as well as other time periods) node-level forecasts for differing granularities. Forecasting may be univariant (e.g., time as the x-axis and upstream band as the y-axis) or multivariant, which may involve adding growth rates or population growth rates. Univariant forecasting may involve Auto-Regressive Integrated Moving Average (ARIMA), regression, exponential smoothing, for example, simple or Holt-Winters. ARIMA may involve modeling serially correlated data with aspects of seasonality. Regression may be used to determine the effects to a target variable by one or more dependent variables. Exponential smoothing may be a method of time series modeling that applies an exponential weighted moving average to predict the future outcome of the target variable. Simple exponential smoothing may, as described above, simply model the moving average with the exponential weighting. Holt-Winters may double the exponential weighting by adding a factor for seasonality. Multivariant forecasting may involve ARIMA, gradient boosting, random forest, Holt-Winters, and/or neural networks. ARIMA in multivariant forecasting may be similar to univariant ARIMA while also including pre-whitened regressors. Pre-whitening may mean addressing white noise of data, or removing bias of a predicted set of data. Gradient boosting may involve iteratively incorporating regression trees (regression-based decision trees) that ensembles weak learners (observations of high error) with strong learners observations of lower error by exponentially weighting the weak (e.g., boosted effect) and strong learners (e.g., dampened effect) until an ideal "learning rate" is achieved and the model predicts without over-fitting. Random forest may be similar to gradient boosting, but instead of boosting high errors, it may randomly generate models to compute a mean prediction. Forecasting may be performed in iterations using one or more different statistical models 1009. This may allow for a most effective forecasting model to be implemented given the data being processed. The most effective model may be selected from the statistical models 1009 (or any other statistical model not listed in 1009) iterated through as described below in model selection under block 1010.

In some embodiments, the forecasting process 1000 may include a block 1010, including model selection. In some instances, model selection may involve predicting and selecting the best statistical model. That is, model selection may involve using an index of methods to determine an optimal model by looking for the smallest indexed score, where the indexed scores may be in the form of an error rate. The error rate may be the same as the residual or the difference between a 'retained value' (or the predicted value) and a 'true value' (or the actual value). The model selection may use a set of information criterion, including (Akaike Information Criterion, corrected (AICc), Mean Absolute Percent Error (MAPE), Weighted Mean Absolute Percent Error (WMAPE), and/or Median Absolute Deviation (MAD). AICc may include an estimator for the quality of a given statistical model that rewards a "goodness to fit" statistic, but penalizes based on a number of estimated parameters (or number of model regressors). This may be used to determine the most "stable" statistical model. MAPE may be used to determine the absolute value of the error. This may be used to reduce the periodic error of the statistical model. WMAPE may be similar to MAPE, but may use weights based on actual values. This may be used with more variant models to improve the understanding of the model error over MAPE. MAD may measure dispersion or variability in predictions. It may be used to pick a model with the least amount of division.

Table 7 below depicts an example listing of error rates for various models associated with particular nodes. Each row of the table may represent a node associated with an identifier "nk." "DS_model2_total" and "DS_model1_total" may represent error rate percentages for two different models. Additionally, the "model2_nodes" column may represent the model that is selected as the best model. In this particular example, "0" may represent model 1 being selected, and "1" may represent model 2 being selected. As one example, the first node, "1-MGAAT" has an error rate of approximately 8% for model 2 and approximately 7% for model 1. Thus, the "model2_nodes" column includes a "0" value, which indicates a model 1 selection. This may be because model 1 has an error rate that is 1% lower than the error rate of model 2.

TABLE 7

| nk | DS_model2_total | DS_model1_total | model2_nodes |
|---|---|---|---|
| 1-THHYT | 8.447253 | 7.400459 | 0 |
| 1-THHYT | 7.097380 | 6.039820 | 0 |
| 1-THHYT | 14.366889 | 13.300287 | 0 |

TABLE 7-continued

| nk | DS_model2_total | DS_model1_total | model2_nodes |
|---|---|---|---|
| 1-THHYT | 143.163412 | 141.718399 | 0 |
| 1-THHYT | 20.617390 | 100.000000 | 1 |
| 1-THHYT | 100.000000 | 100.000000 | 0 |
| 1-THHYT | 20.382517 | 100.000000 | 1 |
| 1-THHYT | 20.498079 | 100.000000 | 1 |

In some embodiments, the forecasting process 1000 may include a block 1012, including clustering and classification. The clustering and classification of block 1012 may be different than the clustering of block 1004 in that the cluster of block 1012 may be performed post modeling and may be used for capacity response for upgrade activities and better decision making. The clustering and classification block 1012 may also be the same as the clustering block 1004. The clustering and classification may differ from dynamic time-warping and may use many different methods such as mixes and weighting. Weighting may involve various weights applied to the above mixes to achieve various scenario-based clusters. In some instances, the mixes may involve at least any of the following dimensions: time to congest (TTC), distance based on latitude and longitude, costs to split, and value of the node (e.g., based on return on investment). That is, a mix of TTC and Latitude/Longitude, or just TTC, or TTC and product value, or all dimensions may be used. With regards to weightings, various weight factors may be applied to these mixes to achieve various scenario-based clusters. When adding multiple dimensions to, the weightings may be used to provide an importance by applying a value (for example, 1-100%). For example, if TTC, costs, and value are selected as dimensions for the mixes, and TTC is determined to be the most important dimensions with value ad cost equally as important, the weights of 50%, 25%, and 25% can be applied, with TTC assigned 50%, so that the nodes congesting in closer intervals may be clustered with a higher weighting, or importance). The methods, for example, may involve K-means or hierarchical, including ward, average, complete, and centroid. The clustering and classification may also be density-based.

In some embodiments, the forecasting process 1000 may include a block 1014, including writing model information to a table. For example, in block 1014, all of the information determined from the previous blocks may be written to a table for reference in providing an ultimate output in the form of a network plan (e.g., an indication of a change to make to one or more elements of the network).

In some embodiments, the forecasting process 1000 may include a block 1016, including outputting to capacity response. Outputting to a capacity response may involve, for example, providing an indication of a change to be made to the network.

FIG. 11 illustrates an example of a node forecast plot 1100 according to an embodiment of the disclosure. In some instances, the node forecast plot 1100 may be an output of the forecasting process 1000. The x-axis 1102 of the node forecast plot 1100 may represent time, and the y-axis 1104 may represent either upstream or downstream bandwidth. The node forecast plot 1100 may be a plot for a single node's bandwidth. The node forecast plot 1200 may also include multiple plots, for example including growth rate (CAGR_load), upstream load original, which may involve forecasting the node as is without performing any clustering (us_load_org), upstream load new, which may involve forecasting that does involve performing clustering (us-_load_new), and actual values.

Figure 12:
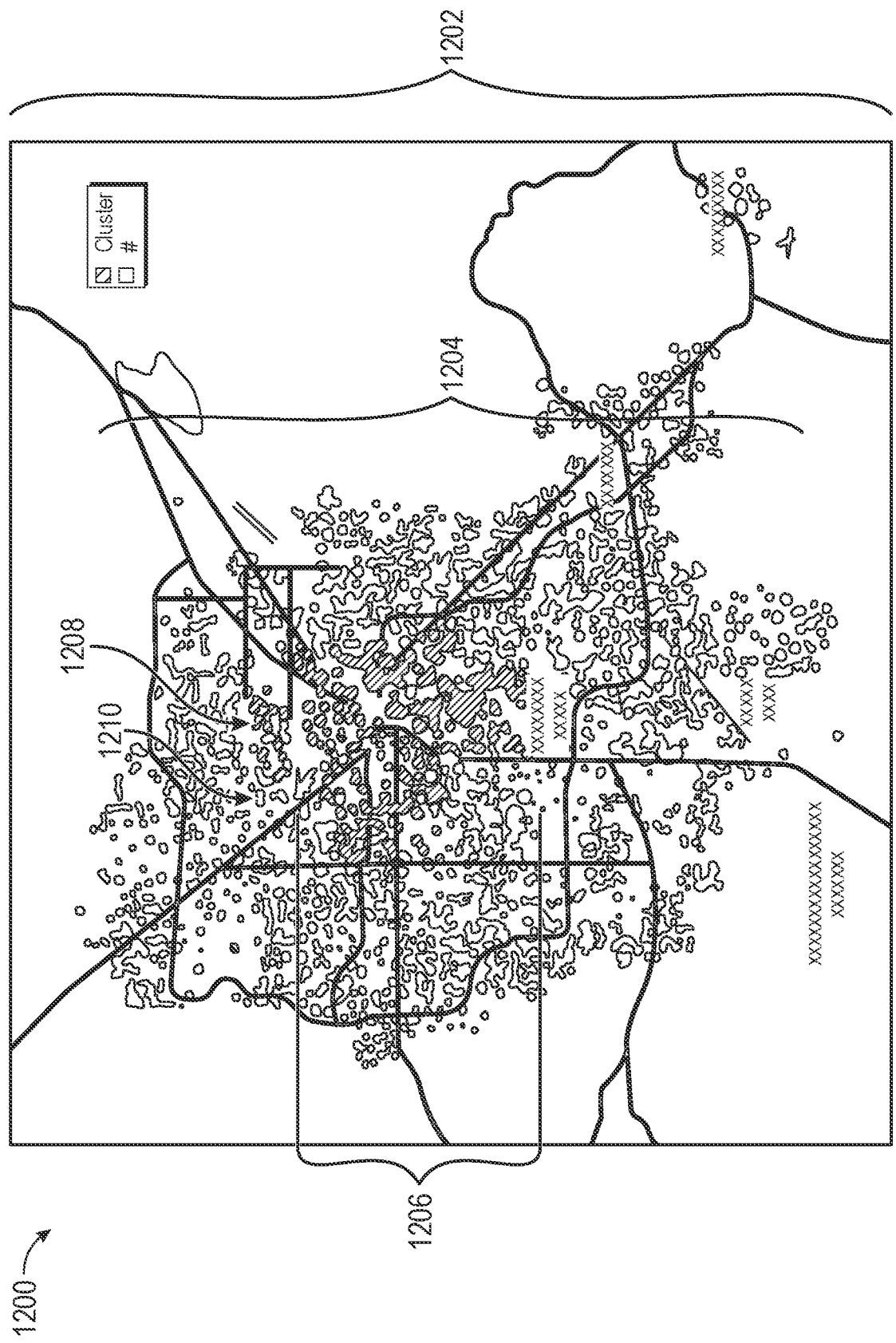
FIG. 12 illustrates an example of a clustering visual map, according to an embodiment of the disclosure.

FIG. 12 illustrates an example of a visualized cluster map 1200 according to an embodiment of the disclosure. The example cluster map 1200 may depict a clustering of a group of nodes 1204 (for example, nodes 102 and/or 104 with reference to FIG. 1) within a geographical area 1202 (for example, the geographical area depicted in the cluster map 1200 may be a city area. The cluster map 1200 may include a cluster of nodes 1206 (e.g., including node 1208). These nodes, for example, may represent nodes associated with a particular technology, such as DOCSIS 3.1. In this regard, nodes may be included within the same geographical area as the cluster of nodes 1206, but may not have been associated with the same clustering parameter (e.g., the type of node technology), so they may not be included within the cluster of nodes 1206. For example, node 1210 is not included in the cluster of nodes 1206. This may be because, for example, node 1210 uses DOCSIS 3.0, or another type of technology other than DOCSIS 3.1. Although the example cluster depicted in FIG. 12 is based on geographical and technological parameters, clusters may be based on any number of other possible types of information as well.

Example Rules Application and Optimization Processes

Figure 13:
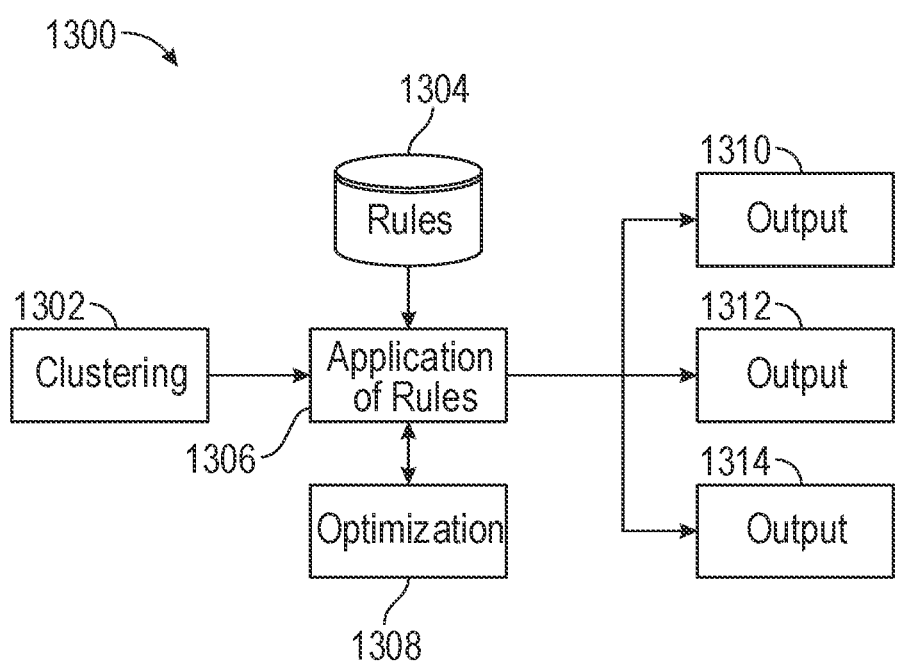
FIG. 13 illustrates an example rules engine process flow, according to an embodiment of the disclosure.

FIG. 13 illustrates an example rules and optimization process 1300 flow according to an embodiment of the disclosure. In some embodiments, the process 1300 may involve clustering 1302. The clustering 1302, for example, may be the same as clustering 208 performed with reference to FIG. 2. In some instances, the clustering 1302 may be the input to an application of rules block at 1306. The application of rules block 1306 may, for example, be the same as the application of rules block 210 with reference again to FIG. 2. The application of rules block 1306 may also optionally receive as inputs, information from the forecasting process described herein or any other source of information. The application of rules block 1306 may receive one or more rules or other conditions or constraints from an external rules database 1304. In some instances, the rules may be stored or determined internally to the application of rules block 1306. The combination of input information, as well as the rules 1304, may be used by the application of rules block 1306 to determine one or more outputs 1310, 1312, and 1314. The one or more outputs 1310, 1312, and 1314, for example, may each individually represent one of the rows illustrated in Table 8 presented below. That is, the application of rules block 1306 may provide multiple outputs in the form of multiple indications of actions that may be taken with regards to a network or elements of the network at given periods in time. The application of rules block 1306, and related functionality may be described in more detail with reference to FIGS. 14 and 15 as well. Additionally, the application of rules block 1306 may work in conjunction with an optimization block 1308, similar to the way the application of rules block 210 works in conjunction with the optimization block 212 with reference to FIG. 2.

Figure 14:
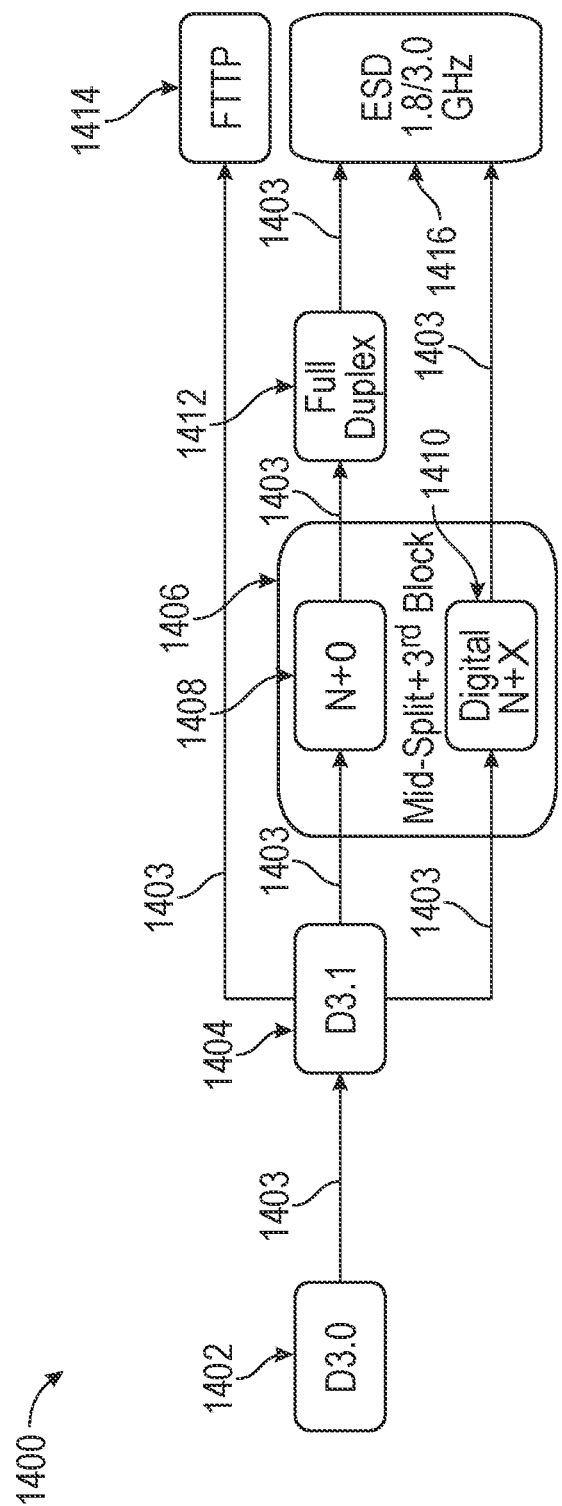
FIG. 14 illustrates an example rules engine process flow, according to an embodiment of the disclosure.

FIG. 14 illustrates an example of a rules engine logical flow 1400 according to an embodiment of the disclosure. The rules engine logical flow 1400 may include several technologies that may be implemented at a node (e.g., block 1402 represents DOCSIS 3.0, block 1102 represents DOCSIS 3.1, etc.). The rules engine logical flow 1400 may initiate at a number of the different provided blocks based on the current technological state of the node being analyzed by the rules engine. For example, node A might currently have DOCSIS 3.1 implemented. Thus the analysis for node A would begin at block 1404. From this point, it would be determined whether node A should experience an N+0 split at block 1408, a N+X split at block 1410, or be upgraded to FTTP technology at block 1414. In some instances, an N+0 split may be more costly and a multi-node split, and in some instances, an N+X split may be a single node split alone. The value after the "+" in "N+X" or "N+0" may represent the number of amplifiers required to get to the home or the premise. For example, N+0 may involve splitting the node to such an extent that each node is so close to an associated home that no amplifiers are required. The decisions made in the rules engine logical flow 1140 may be performed on a node by node basis, but sometimes actions may be taken at the cluster level or an even higher level. This may depend on the data received that is received. For example, if it is determined that all nodes at a particular facility need the same change, then the decision will be made at the facility level instead of the node level. Upgrade paths 1403 may be chosen based on business-level prioritization, backed by baseline internal logic. The model may be predisposed to selecting the most cost-effective action to handle projected congestion deadlines in an ad-hoc manner, but external parameters may redirect the model to choose paths that prioritize long-term goals, such as a business-wide N+0 deployment target.

Table 8 depicts an example of several outputs of the rules engine, for an example node with an identification number of "8900." Each row in Table 8 represents a different action that may be taken at the listed date (e.g., Oct. 31, 2020, Apr. 30, 2021, etc.). The "technology" column identifies whether a technology change is to be performed at the nod (e.g., a listing of "D31" would indicate a change to DOCSIS 3.1). The "br_applied" column indicates the business rule that should be applied to the node. For example, N+0 indicates that a multi-node split should be performed. These node upgrade options provided in Table 8 may also be consolidated into a single upgrade recommendation using the optimization engine described below. The rules engine initially be used to determine node upgrades within a network, in that the rules engine may supplement the optimization engine, however, the optimization engine may ultimately take control of node upgrade decision making after a given period of time (this will be described in more detail with reference to the optimization engine below).

TABLE 8

| node id | date action | technology | br applied |
|---------|-------------|------------|------------|
| 8900 | Oct. 31, 2020 | D31 | MS |
| 8900 | Apr. 30, 2021 | D31 NO | N + 0 |
| 8900 | Jul. 31, 2022 | PON | FTTP |
| 8900 | Sep. 30, 2023 | PON | N + 0 |

Figure 15:
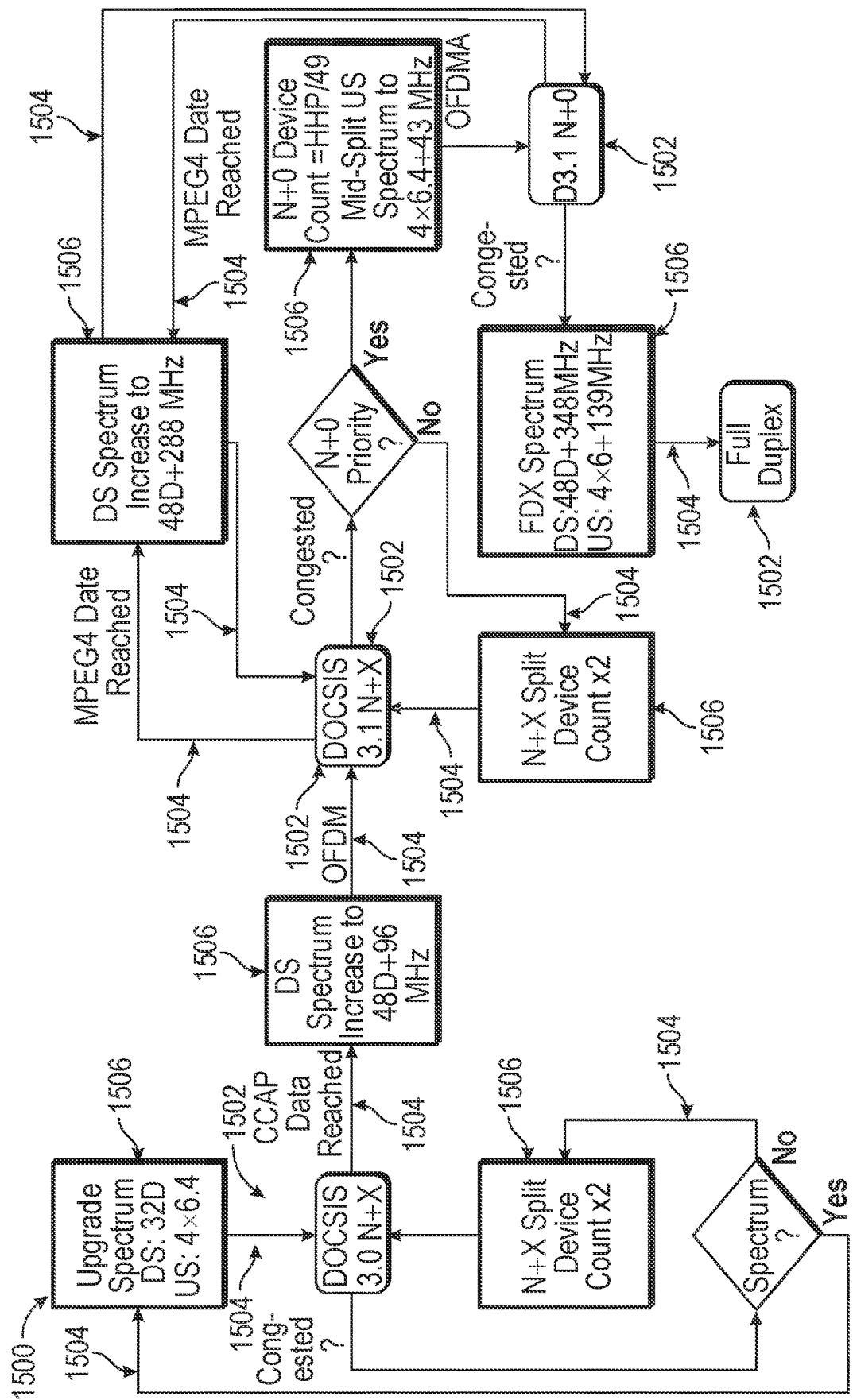
FIG. 15 illustrates an example of a rules logical flow, according to an embodiment of the disclosure.

FIG. 15 illustrates another example rules of engine logical flow 1500 according to an embodiment of the disclosure. The rules engine logical flow 1500 in FIG. 15 may be in the form of a state machine and may serve to further exemplify the functionality of the rules engine. The rules engine logical flow 1500 may include various technological states 1502 for a node. For example, the node may be configured for DOCSIS 3.0. The rules engine logical flow 1500 may also include various conditional branches 1504. For example, one condition may be whether or not there is congestion at the node. The rules engine logical flow 1500 may also identify various actions 1506 to be taken based on the conditional branch 1504 that is logically followed. For example, a node configured for DOCSIS 3.0 that is congested would result in an N+X split to double the device count. It is important to note that although not all technological states 1502, conditional branches 1504, and actions 1506 have been labeled in FIG. 15, these reference labels still apply equally to like elements. For example, the DS spectrum increase to 48D+288 MHz box is also an action 1506 even though it does not include a reference numeral 1506.

FIG. 16 illustrates an example optimization process flow 1600 according to an embodiment of the disclosure. In some embodiments, the optimization 1606 may be a process that is configured to operate under constraint programming to determine an optimal solution for a given node. For example, the optimization 1606 may receive as inputs one or more optional solution routes that may be taken as well as constraints on the solutions and is tasked with selecting the most optimal solution route. The optimization 1606 may be implemented in the form of artificial intelligence such as machine learning or neural networks, and may initially use input from the application of rules block 1607 (e.g., that may include hardcoded or static rules) to reach the single optimal solution. Eventually, however, the optimization 1606 may be capable of operating without the application of rules block 1607, such that the data captured during the data capturing and processing may be fed to the optimization 1606 itself to determine an optimal solution. In some instances, the optimization 1606 may provide an output that is in the form of one of the example options provided in Table 8. That is, the optimization 1606 may simplify network upgrade determinations by providing a single action to take on each node (removing the need to select from several options for each node of potentially tens of thousands of nodes in a given network).

As depicted in FIG. 16, the optimization 1606 may receive various inputs, such as conditions 1602 for a node and constraints 1604. Examples of conditions and/or constraints may be depicted in further detail with reference to FIG. 17. The conditions may be obtained from a configuration file (e.g., the configuration file as depicted with reference to FIG. 3). However, the conditions may also be obtained from any other source. Example conditions 1602 for a node may include a monthly profit, a cost of upgrade by technology, and a maintenance cost of each technology, to name a few. Example constraints 1604 may include time to upgrade, number of nodes that can be upgraded each year, the total annual budget, and the technology upgrade policy, to name a few. Other potential examples of conditions 1602 and/or constraints 1604 may include potential strategies up for consideration that include possible deployment dates, aggregate goals, and prioritization at different levels based on market values. Based on these inputs, the optimization engine 1606 may determine an output 1608, which may be in the form of a determined plan of action for the node. The plan of action may be the most optimal plan for minimizing cost while also maximizing profit. For example, the plan of action may indicate an optimal date to upgrade the technology of the node (e.g., from DOCSIS 3.0 to DOCSIS 3.1).

An example of an optimization output may be provided in Table 9.

TABLE 9

| node id | date_action | technology | n0_build_cost | nx_build_cost | non_build_cost_ | br_applied | ms_build_cost | n0_build_ cost |
|---|---|---|---|---|---|---|---|---|
| 4290 | Oct. 31, 2020 | D31 | 246419.9 | 52438.23 | 40620.3 | MS | 34110.74 | 246419.9 |
| 4290 | Apr. 30, 2021 | D31 NO | 246419.9 | 52438.23 | 40620.3 | N + 0 | 34110.74 | 246419.9 |
| 4290 | Jul. 31, 2022 | PON | 246419.9 | 52438.23 | 40620.3 | FTTP | 34110.74 | 246419.9 |
| 4290 | Sep. 30, 2023 | PON | 246419.9 | 52438.23 | 40620.3 | N + 0 | 34110.74 | 246419.9 |

FIG. 17 depicts an example optimization use case 1700 in accordance with an embodiment of the disclosure. The optimization use case 1700 may include one or more conditions 1702 for an example node with an identification number of 4280. The conditions may include, for example, a monthly profit 1703, a cost to upgrade the technology 1704, a maintenance cost of each technology 1705, and any number of additional conditions 1706. The optimization use case 1700 may also include one or more constraints. The constraints 1707 may include, for example, a time to upgrade 1708, a number of nodes that can be upgraded every year 1709, a total annual budget 1710, and any number of additional constraints 1711. The optimization use case 1700 may also include a goal 1706 that is sought after. For example, the goal 1706 in this instance may be to minimize cost and maximize profitability of the node 4280. This goal 1706 may be represented as the function depicted in block 1708. This function may, for example, be used to determine a solution that minimizes cost of upgrade and maximizes the profitability of the node. For example, the solution may dictate that the node be upgraded on a particular date.

Example Method

Figure 18:
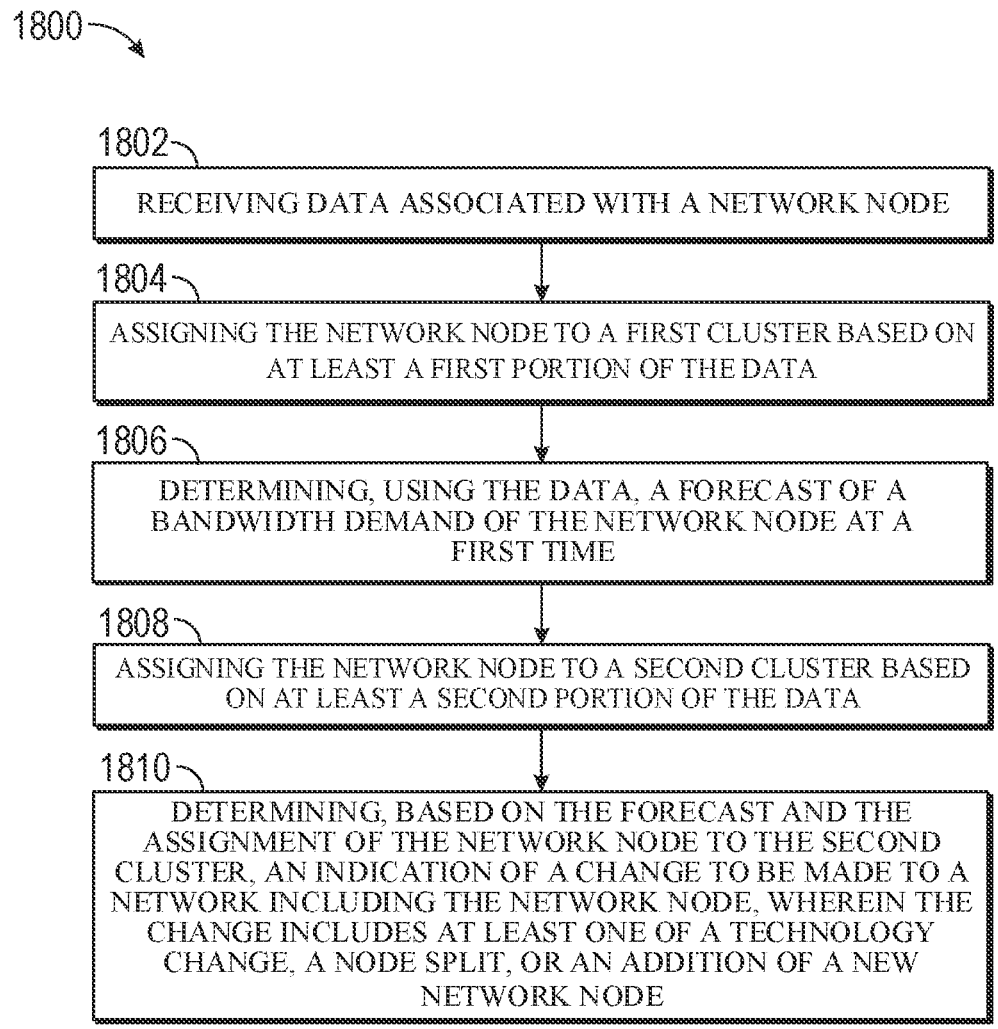
FIG. 18 illustrates an example method, according to an embodiment of the disclosure.

FIG. 18 illustrates an example method 1800 according to an embodiment of the disclosure.

In some embodiments, the method 1800 may include an operation 1802 of receiving data associated with a network node.

In some embodiments, the method 1800 may include an operation 1804 of assigning the network node to a first cluster based on at least a first portion of the data.

In some embodiments, the method 1800 may include an operation 1806 of determining, using the data, a forecast of a bandwidth demand of the network node at a first time.

In some embodiments, the method 1800 may include an operation 1808 of assigning the network node to a second cluster based on at least a second portion of the data.

In some embodiments, the method 1800 may include an operation 1810 of determining, based on the forecast and the assignment of the network node to the second cluster, an indication of a change to be made to a network including the network node, wherein the change includes at least one of a technology change, a node split, or an addition of a new network node.

Example Computer Hardware Architecture

Figure 19A:
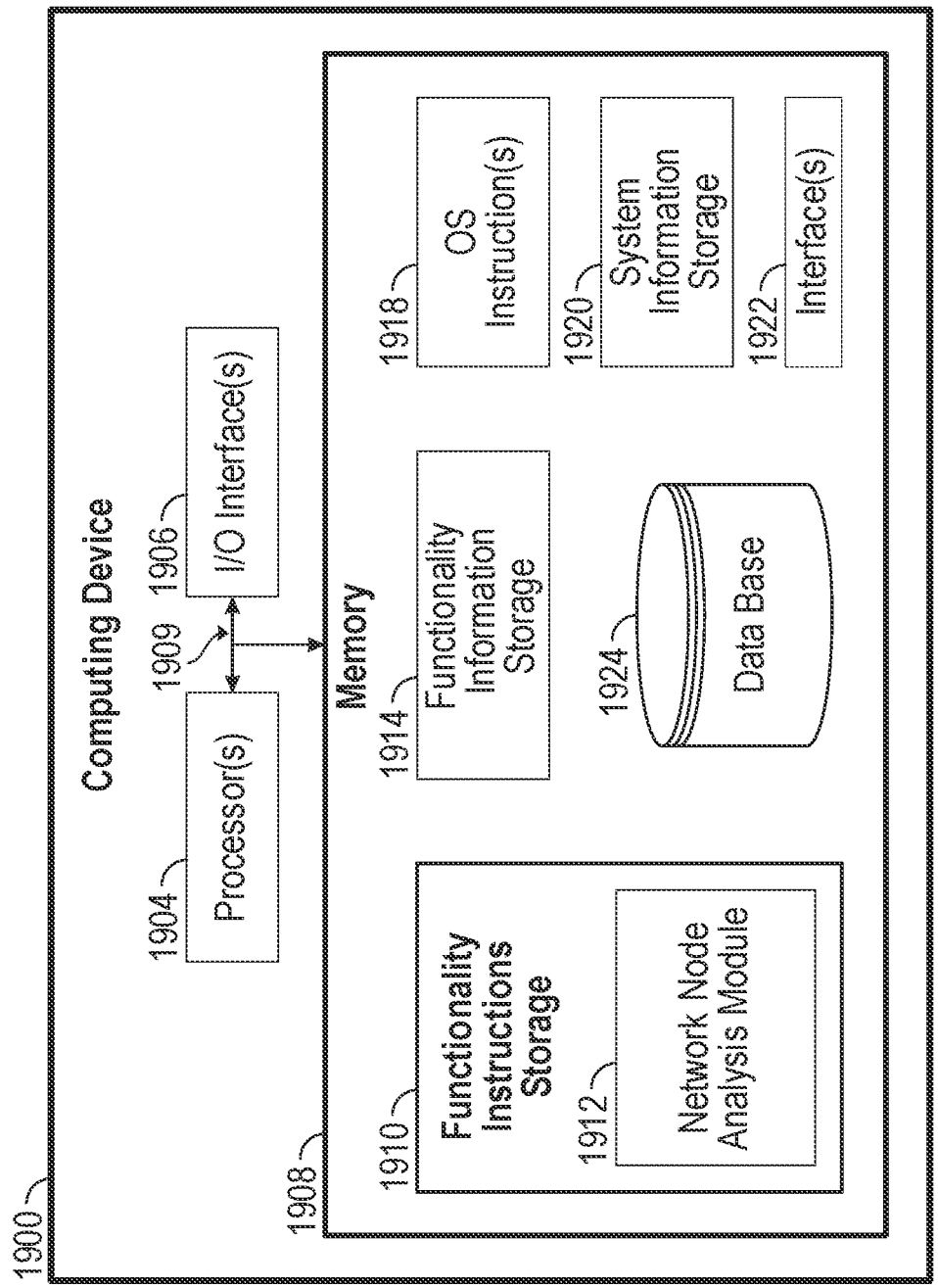
FIGS. 19A-19B illustrates an example of computer hardware architecture, according to an embodiment of the disclosure.
Figure 19B:
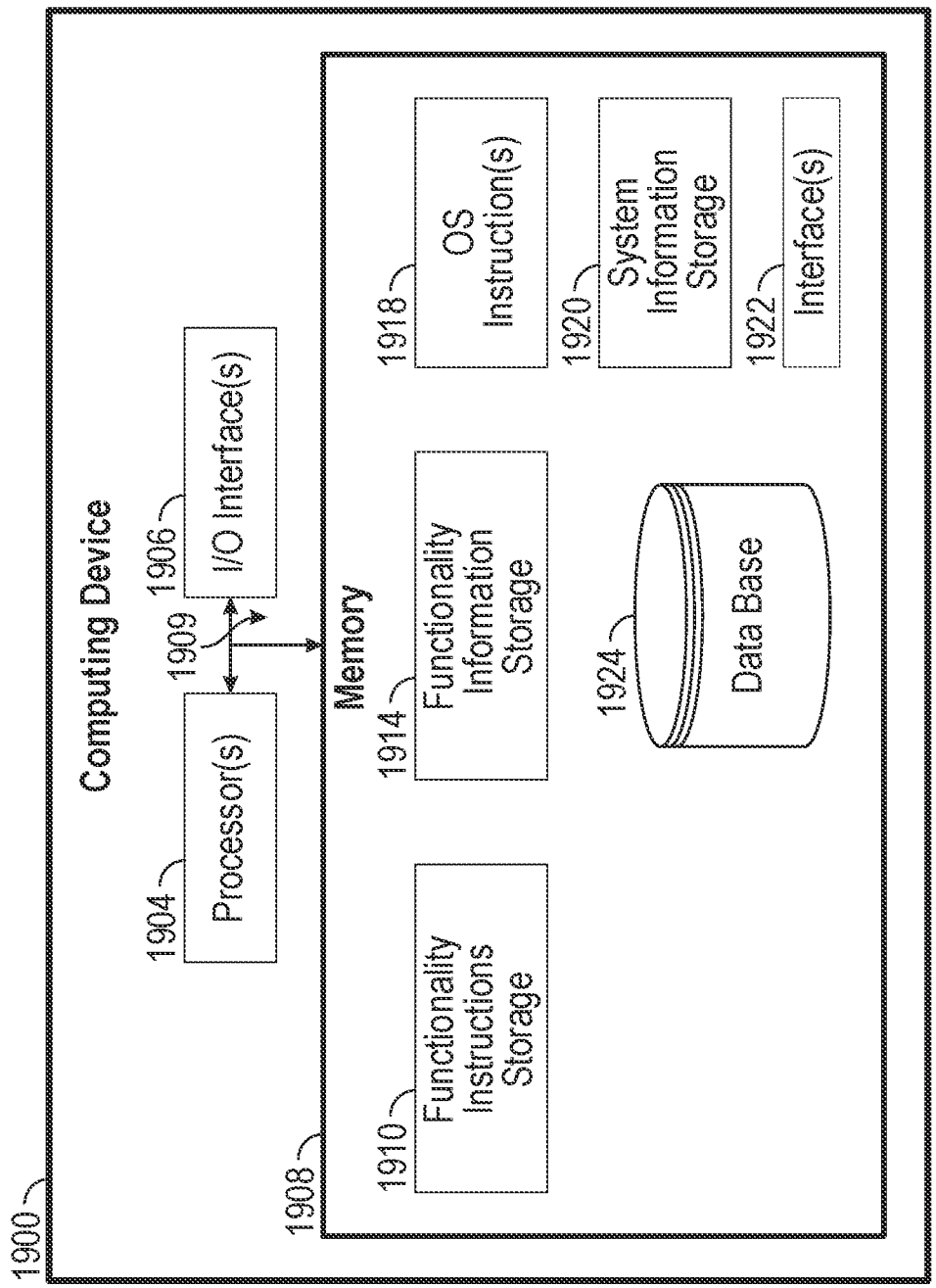

FIGS. 19A and 19B illustrate an example computer hardware architecture according to an embodiment of the disclosure. Illustrates a block diagram of an example of a computing device 1900 in accordance with one or more aspects of the disclosure. FIG. 19B may be similar to FIG. 19A, but it may differ in that it may not include a network node analysis module 1912. The example computing device 1900 is merely illustrative and is not intended to suggest or otherwise convey any limitation as to the scope of use or functionality of the computing device's architecture. In addition, the illustrative computing device 1900 depicted in FIG. 20 should not be interpreted as having any dependency or requirement relating to any one or combination of components illustrated as part of the computing device 1900.

The computing device 1900 represents an example implementation of various aspects of the disclosure in which the processing or execution of operations described in connection with systems and methods for network configuration management as disclosed herein can be performed in response to execution of one or more software components at the computing device 1900. The computing device 1900 may represent any of the devices described herein, such as the system 108 with reference to FIG. 1, which may be operable to carry out the functionality described in FIG. 2, or any of the other FIGS described herein. It should be appreciated that the one or more software components can render the computing device 1900, or any other computing device that contains such components, a particular machine for systems and methods for network configuration management as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods and/or process flows described herein, such as the example methods and or process flows presented in at least FIGS. 2, 8, 10, 14, 15, 16, and 19. For instance, to embody one such method, at least a portion of the computer-accessible instructions can be persisted (e.g., stored, made available, or stored and made available) in a computer storage non-transitory medium and executed by a processor. The one or more computer-accessible instructions that embody a software component can be assembled into one or more program modules that can be compiled, linked, and/or executed at the computing device 1900 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1900 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects of the disclosure in connection with systems and methods for network configuration management as described herein can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers (PLCs), distributed computing environments that comprise any of the above systems or devices, or the like.

As illustrated, the computing device 1900 can comprise one or more processor(s) 1904, one or more input/output (I/O) interface(s) 1906, one or more memory devices 1908 (herein referred to generically as memory 1908), and a bus architecture 1909 (also termed bus 1909) that functionally couples various functional elements of the computing device 1900. In certain embodiments, the computing device 1900 can include, optionally, a radio unit (not depicted in FIG. 20). The radio unit can include one or more antennas and a communication processing unit that can permit wireless communication between the computing device 1900 and one or more other devices. The bus 1909 can include at least one of a system bus, a memory bus, an address bus, or a message bus, and can permit exchange of information (data, metadata, and/or signaling) between the processor(s) 1904, the I/O interface(s) 1906, and/or the memory 1908, or respective functional elements therein. In scenarios in which processor(s) 1904 include multiple processors, the computing device 1900 can utilize parallel computing.

The I/O interface(s) 1906 can permit communication of information between the computing device and an external device, such as another computing device, e.g., a network element or an end-user device. Such communication can include direct communication or indirect communication, such as exchange of information between the computing device 1900 and the external device via a network or elements thereof. In some embodiments, the I/O interface(s) 1906 can comprise one or more of network adapter(s) and peripheral adapter(s). Such adapter(s) can permit or facilitate connectivity between the external device and one or more of the processor(s) 1904 or the memory 1908. For example, the peripheral adapter(s) can include a group of ports, which can comprise at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

In one aspect, at least one of the network adapter(s) can functionally couple the computing device 1900 to one or more other devices via one or more traffic and signaling pipes that can permit or facilitate exchange of traffic and signaling between the computing device 1900 and the one or more other devices. Such network coupling provided at least in part by the at least one of the network adapter(s) can be implemented in a wired environment, a wireless environment, or a combination of both. The information that is communicated by the at least one of the network adapter(s) can result from implementation of one or more operations in a method of the disclosure. Such output can include any form of visual representation, including, but not limited to, textual, graphical, animation, audio, tactile, or the like.

In one aspect, the bus 1909 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, a Universal Serial Bus (USB) and the like. The bus 1909, and all buses described herein can be implemented over a wired or wireless network connection, and each of the subsystems, including the processor(s) 1904, the memory 1908 and memory elements therein, and the I/O interface(s) 1906 can be contained within one or more remote computing devices at physically separate locations, connected through buses of this form, thereby effectively implementing a fully distributed system.

The computing device 1900 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1900, and can comprise, for example, both volatile and non-volatile media, and removable and/or non-removable media. In one aspect, the memory 1908 can comprise computer-readable media in the form of volatile memory, such as random access memory (RAM), and/or non-volatile memory, such as read-only memory (ROM).

The computing device 1900 may also include a database 1924. Although FIGS. 19A and/or 19B depict the database 1924 as being included within the computing device 1900, the database 1924 may be included within the computing device 1900 or may also be located externally to the computing device 1900. For example, the database may represent the location from which the rules 124 are received with reference to FIG. 1. However, the database 1924 may also include any other database for storing, sending, or receiving information to and from any of the elements described herein.

The memory 1908 can comprise functionality instructions storage 1910 and functionality information storage 1914. The functionality instructions storage 1910 can comprise computer-accessible instructions that, in response to execution by at least one of the processor(s) 1904, can implement one or more of the functionalities of the disclosure. The computer-accessible instructions can embody or can comprise one or more software components illustrated as network node analysis module 1912. In one scenario, execution of at least one component of the network node analysis module 1912 can implement one or more of the example methods and/or process flows described herein, such as the example methods and or process flows presented in at least FIGS. 2, 8, 10, 14, 15, 16, and 19. For instance, such execution can cause a processor that executes the at least one component to carry out a disclosed example method and/or process flow. It should be appreciated that, in one aspect, a processor of the processor(s) 1904 that executes at least one of the network node analysis module 1912 can retrieve information from or retain information in a memory element 1908 in the functionality information storage 1914 in order to operate in accordance with the functionality programmed or otherwise configured by the network node analysis module 1912. Such information can include at least one of code instructions, information structures, or the like. Such instructions and information structures can embody or can constitute machine-learning techniques (e.g., pattern recognition algorithms, inference algorithms, and the like) that can be utilized to implement at least certain functionality described herein. At least one of the one or more interfaces (e.g., application programming interface(s)) can permit or facilitate communication of information between two or more components within the functionality instructions storage 1910. The information that is communicated by the at least one interface can result from implementation of one or more operations in a method of the disclosure. In certain embodiments, one or more of the functionality instructions storage 1910 and the functionality information storage 1914 can be embodied in or can comprise removable/non-removable, and/or volatile/non-volatile computer storage media.

At least a portion of at least one of the network node analysis module 1912 can program or otherwise configure one or more of the processors 1904 to operate at least in accordance with the functionality described herein. In one embodiment, the network node analysis module 1912 contained in the functionality instruction(s) storage 1910 can include one or more components that can provide the functionality described herein in connection with systems and methods for network configuration management. One or more of the processor(s) 1904 can execute at least one of the network node analysis module 1912 and leverage at least a portion of the information in the functionality information storage 1914 in order to provide systems and methods for network configuration management in accordance with one or more aspects described herein.

It should be appreciated that, in certain scenarios, the functionality instruction(s) storage 1914 can embody or can comprise a computer-readable non-transitory storage medium having computer-accessible instructions that, in response to execution, cause at least one processor (e.g., one or more of processor(s) 1904) to perform a group of operations comprising the operations or blocks described in connection with the disclosed methods.

In addition, the memory 1908 can comprise computer-accessible instructions and information (e.g., data and/or metadata) that permit or facilitate operation and/or administration (e.g., upgrades, software installation, any other configuration, or the like) of the computing device 1900. Accordingly, as illustrated, the memory 1908 can comprise a memory element 1918 (labeled operating system (OS) instruction(s) 1918) that can contain one or more program modules that embody or include one or more operating systems, such as a Windows operating system, Unix, Linux, Symbian, Android, Chromium, or substantially any OS suitable for mobile computing devices or tethered computing devices. In one aspect, the operational and/or architectural complexity of the computing device 1900 can dictate a suitable OS. The memory 1908 also comprises a system information storage 1920 having data and/or metadata that permits or facilitates operation and/or administration of the computing device 1910. Elements of the OS instruction(s) 1918 and the system information storage 1920 can be accessible or can be operated on by at least one of the processor(s) 1904.

It should be recognized that while the functionality instructions storage 1910 and other executable program components, such as the OS instruction(s) 1918, are illustrated herein as discrete blocks, such software components can reside at various times in different memory components of the computing device 1900, and can be executed by at least one of the processor(s) 1914. In certain scenarios, an implementation of the network node analysis module 1912 can be retained on or transmitted across some form of computer-readable media.

The computing device 1900 can include a power supply (not shown), which can power up components or functional elements within such devices. The power supply can be a rechargeable power supply, e.g., a rechargeable battery, and it can include one or more transformers to achieve a power level suitable for operation of the computing device 1900, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s)) to connect operationally to the conventional power grid. In another aspect, the power supply can include an energy conversion component, such as a solar panel, to provide additional or alternative power resources or autonomy for the computing device 1900.

The computing device 1900 can operate in a networked environment by utilizing connections to one or more other devices. As an illustration, the one or more other devices can be a personal computer, a portable computer, a server, a router, a network computer, a peer device, or other common network node, and so on. As described herein, connections (physical and/or logical) between the computing device 1900 and a computing device of the one or more other devices can be made via one or more traffic and signaling pipes, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

For purposes of simplicity of explanation, the example methods disclosed herein are presented and described as a series of blocks. However, it is to be understood and appreciated that the disclosed methods are not limited by the order of blocks and associated actions, as some blocks may occur in different orders and/or concurrently with other blocks from that shown and described herein. For example, the various methods or processes of the disclosure can be alternatively represented as a series of interrelated states or events, such as in a state diagram. Furthermore, not all illustrated blocks and associated action(s) may be required to implement a method in accordance with one or more aspects of the disclosure. Further yet, two or more of the disclosed methods or processes can be implemented in combination with each other, to accomplish one or more features or advantages described herein. At least a portion of the methods described herein can be implemented (e.g., configured (such as linked, compiled, a combination thereof, or the like); executed; configured and executed; or the like) by a system having at least one processor and at least one information storage devices (which also may be referred to as at least one memory device or at least one memory). Such a system can comprise one or more computing devices or one or more processors, and can be employed to execute computer-accessible instructions retained in a memory, or any computer-readable or machine-readable medium, to implement the methods described herein. The computer-accessible instructions can provide a computer-executable or machine-executable framework to implement the methods described herein.

It should be further appreciated that the example methods of the disclosure can be retained on an article of manufacture, or computer-readable medium, to permit or otherwise facilitate transporting and transferring such methods to a computing device (e.g., a desktop computer, a mobile computer, such as a tablet or a smartphone; a mobile telephone, a blade computer, a programmable logic controller, and the like) for execution, and thus implementation, by a processor of the computing device or for storage in a memory thereof.

The invention claimed is:

1. An intelligent networking planning method comprising:
    receiving data associated with a network node, the data including data of a first type and data of a second type, the data of the first type and the data of the second type being different, wherein the data includes a node identifier for the network node;
    extracting, subsequent to receiving the data and using fuzzy logic, a node number from the node identifier;
    assigning the network node to a first cluster based on the data of the first type, the data of the first type including bandwidth data;
    determining, using the data of the first type and subsequent to extracting the node number from the node identifier, a forecast of a bandwidth demand of the network node at a first time;
    assigning the network node to a second cluster based on the data of the second type; and
    determining, based on the forecast and the assignment of the network node to the second cluster, an indication of a first change to be made to a network including the network node, wherein the first change includes at least one of: a technology change, a node split, or an addition of a new network node;
    determining a first rule that results in the first change and a second rule that results in a second change, wherein the first change is different than the second change, wherein the first rule is associated with a first weight value indicative of a priority, and the second rule is associated with a second weight value indicative of a different priority; and
    determining, based on the first rule and first weight value and second rule and second weight value, that the second change is to be made to the network including the network node, wherein the second change includes at least one of: a firmware change, a node split, or an addition of a new network node.

2. The method of claim 1, wherein the data of the second type includes at least one of topology data, telemetry data, geography data, configuration information, or input information.

3. The method of claim 1, further comprising:
    performing, using fuzzy logic, an analysis of the data to generate second data;
    determining a cadence of the second data, wherein the cadence comprises a frequency at which the data is received from the network node;
    comparing the frequency at which the data is received from the network node to a threshold frequency; and
    performing de-noising of the second data, wherein de-noising removes one or more abnormalities in the cadence from the network node.

4. The method of claim 1, where to assign the network node to a first cluster based on the data of the first type further comprises:
    determining, based on the forecast, that the network node is associated with a growth rate; and
    determining, based on the growth rate, to assign the network node the first cluster.

5. The method of claim 1, wherein to determine, using the data, the forecast of the bandwidth demand of the network node at the first time further comprises:
    receiving a regressor set; and
    performing, using a first statistical model, dynamic time-warping on the data, wherein the dynamic time-warping is based on at least one of seasonality or periodicity.

6. The method of claim 5, wherein the regressor set includes either time-based regressors or external regressors, the external regressors including at least one of customer counts, value-per-node, number of commercial passings, or socioeconomic data.

7. The method of claim 5, further comprising:
performing, using a second statistical model, dynamic time-warping on the data;
receiving an error rate associated with the first statistical model and an error rate associated with the second statistical model;
determining that the error rate associated with the first statistical model is less than the error rate associated with the second statistical model; and
selecting, based on the determination that the error rate associated with the first statistical model is less than the error rate associated with the second statistical model, an output associated with the first statistical model.

8. The method of claim 1, wherein to determine, based on the forecast and the assignment of the network node to the second cluster, an indication of a change to be made to a network including the network node further comprises:
identifying a plurality of indications of changes;
receiving a constraint, wherein the constraint is configured to at least one of minimize a cost of the network node or maximize a profitability of the network node; and
selecting, based on the constraint, the first change to be made to the network from the plurality of indications of changes to the network.

9. The method of claim 3, wherein performing de-noising of the second data further comprises:
determining, that the frequency at which the data is received from the network node is below the threshold frequency; and
imputing, based on the determination that the frequency is below the threshold frequency, a missing data value for the network node.

10. A network configuration management system comprising:
a computer processor operable to execute a set of computer-readable instructions; and
a memory operable to store the set of computer-readable instructions operable to:
receive data associated with a network node, the data including data of a first type and data of a second type, the data of the first type and the data of the second type being different, wherein the data includes a node identifier for the network node;
extract, subsequent to receiving the data and using fuzzy logic, a node number from the node identifier;
assign the network node to a first cluster based on the data of the first type, the data of the first type including bandwidth data;
determine, using the data of the first type and subsequent to extracting the node number from the node identifier, a forecast of a bandwidth demand of the network node at a first time;
assign the network node to a second cluster based on the data of the second type;
determine, based on the forecast and the assignment of the network node to the second cluster, an indication of a first change to be made to a network including the network node, wherein the first change includes at least one of: a firmware change, a node split, or an addition of a new network node;
determine a first rule that results in the first change and a second rule that results in a second change, wherein the first change is different than the second change, wherein the first rule is associated with a first weight value, and the second rule is associated with a second weight value; and
determine, based on the first rule and first weight value and second rule and second weight value, that the second change is to be made to the network including the network node, wherein the second change includes at least one of: a firmware change, a node split, or an addition of a new network node.

11. The system of claim 10, wherein the data of the second type includes at least one of: topology data, telemetry data, geography data, configuration information, or input information.

12. The system of claim 10, wherein the computer-readable instructions are further operable to:
determine a cadence of the data, wherein the cadence comprises a frequency at which the data is received from the network node; and
perform de-noising of the data, wherein de-noising removes one or more abnormalities in the cadence from the network node.

13. The system of claim 10, where to assign the network node to a first cluster based on the data of the first type further comprises:
determine, based on the forecast, that the network node is associated with a growth rate; and
determine, based on the growth rate, to assign the network node the first cluster.

14. The system of claim 10, wherein to determine, using the data, the forecast of the bandwidth demand of the network node at the first time further comprises:
receive a regressor set; and
perform, using a first statistical model, dynamic time-warping on the data, wherein the dynamic time-warping is based on at least one of seasonality or periodicity.

15. The system of claim 14, wherein the regressor set includes either time-based regressors or external regressors, the external regressors including at least one of customer counts, value-per-node, number of commercial passings, or socioeconomic data.

16. The system of claim 14, where in the computer-readable instructions are further operable to:
perform, using a second statistical model, dynamic time-warping on the data;
receive an error rate associated with the first statistical model and an error rate associated with the second statistical model;
determine that the error rate associated with the first statistical model is less than the error rate associated with the second statistical model; and
select, based on the determination that the error rate associated with the first statistical model is less than the error rate associated with the second statistical model, an output associated with the first statistical model.

17. The system of claim 10, wherein to determine, based on the forecast and the assignment of the network node to the second cluster, an indication of a change to be made to a network including the network node further comprises:
identify a plurality of indications of changes;
receive a constraint, wherein the constraint is configured to at least one of minimize a cost of the network node or maximize a profitability of the network node; and
select, based on the constraint, the first change to be made to the network from the plurality of indications of changes to the network.

18. A non-transitory computer-readable medium storing computer-executable instructions, that when executed by at least one processor, cause the at least one processor to:
receive data associated with a network node, the data including data of a first type and data of a second type, the data of the second type being different than the data of the first type, wherein the data includes a node identifier for the network node;

extract, subsequent to receiving the data and using fuzzy logic, a node number from the node identifier;

assign the network node to a first cluster based on the data of the first type, the data of the first type including bandwidth data;

determine, using the data of the first type and subsequent to extracting the node number from the node identifier, a forecast of a bandwidth demand of the network node at a first time;

assign the network node to a second cluster based on the data of the second type; and determine, based on the forecast and the assignment of the network node to the second cluster, an indication of a first change to be made to a network including the network node, wherein the first change includes at least one of: a firmware change, a node split, or an addition of a new network node;

determine a first rule that results in the first change and a second rule that results in a second change, wherein the first change is different than the second change, wherein the first rule is associated with a priority, and the second rule is associated with a different priority; and determine, based on the first rule and priority and second rule and different priority, that the second change is to be made to the network including the network node, wherein the second change includes at least one of: a firmware change, a node split, or an addition of a new network node.

19. The non-transitory computer-readable medium of claim 18, wherein the data includes at least one of topology data, telemetry data, geography data, configuration information, or input information.

20. The non-transitory computer-readable medium of claim 18, wherein the computer-executable instructions further cause the at least one processor to:

perform, using fuzzy logic, an analysis of the data to generate second data;

determine a cadence of the second data, wherein the cadence comprises a frequency at which the data is received from the network node;

compare the frequency at which the data is received from the network node to a threshold frequency; and perform de-noising of the second data, wherein de-noising removes one or more abnormalities in the cadence from the network node.

* * * * *